(12) United States Patent
Halabieh

(10) Patent No.: US 10,620,598 B2
(45) Date of Patent: *Apr. 14, 2020

(54) METHODS AND SYSTEMS FOR CONTROLLING GENERATING UNITS AND POWER PLANTS FOR IMPROVED PERFORMANCE

(71) Applicant: General Electric Company, Schenectady, NY (US)

(72) Inventor: Abdul Halabieh, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/941,751

(22) Filed: Mar. 30, 2018

(65) Prior Publication Data

US 2018/0356780 A1   Dec. 13, 2018

Related U.S. Application Data

(60) Provisional application No. 62/518,446, filed on Jun. 12, 2017.

(51) Int. Cl.
| | | |
|---|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 19/042 | (2006.01) |
| G06Q 50/06 | (2012.01) |
| G06Q 50/04 | (2012.01) |

(52) U.S. Cl.
CPC ........... *G05B 19/042* (2013.01); *G06Q 50/04* (2013.01); *G06Q 50/06* (2013.01); *G05B 2219/2639* (2013.01)

(58) Field of Classification Search
CPC .................................................... G06Q 50/06
USPC ......................................................... 700/295
See application file for complete search history.

(56) References Cited

U.S. PATENT DOCUMENTS 7,873,441 B2   1/2011   Synesiou et al.
9,945,264 B2   4/2018   Wichmann et al.
(Continued)

OTHER PUBLICATIONS

U.S. Appl. No. 15/941,781, Non-Final Office Action dated Oct. 11, 2019, 35 pages.

*Primary Examiner* — Md Azad
(74) *Attorney, Agent, or Firm* — James Pemrick; Hoffman Warnick LLC

(57) ABSTRACT

A method for controlling a power plant that includes: presenting on a first user device a proposed version of the generating plan for a future generating period; receiving at the first user device a user input making a first modification to the proposed version to create a bid version of the generating plan; presenting on a second user device the bid version of the generating plan so that an indicator indicates the aspect that was modified by the first modification; receiving a user input on the second user device for creating a bid based on the bid version of the generating plan; transmitting from the second user device the bid; receiving at the second user device a response comprising an awarded fleet capacity; and transmitting from the second user device to the first user device an awarded plant-level capacity based on the awarded fleet capacity.

18 Claims, 15 Drawing Sheets

(56) References Cited

U.S. PATENT DOCUMENTS

| | | | |
|---|---|---|---|
| 2002/0120412 A1* | 8/2002 | Hayashi | G05F 1/66 702/61 |
| 2008/0046387 A1* | 2/2008 | Gopal | G01D 4/004 705/412 |
| 2008/0172312 A1* | 7/2008 | Synesiou | G06Q 10/00 705/34 |
| 2010/0318934 A1 | 12/2010 | Blevins et al. | |
| 2012/0290104 A1* | 11/2012 | Holt | G06Q 10/00 700/29 |
| 2015/0184549 A1* | 7/2015 | Pamujula | F01K 23/101 700/287 |
| 2015/0185716 A1* | 7/2015 | Wichmann | F01K 23/101 700/287 |
| 2016/0146118 A1 | 5/2016 | Wichmann et al. | |
| 2017/0091791 A1 | 3/2017 | Srinivasan et al. | |
| 2017/0364043 A1 | 12/2017 | Ganti et al. | |
| 2018/0356781 A1 | 12/2018 | Fu | |
| 2019/0128933 A1 | 5/2019 | Ishigaki | |

* cited by examiner

Power Plant
8:25

Energy Credit Bank  04/22/2017 through next outage date
-- MWh                    312 MWh              359 MWh
day's usage          current balance      forecasted balance 49° °F  30.2 in  84 %

04/22/2017  Submission Required

Submit Plan — 608

∨ CAPACITY OVERVIEW

∧ CAPACITY PLANNING

Table   Unit View   Plot

| Time | Ambient Temperature | Configurations | | | | |
|------|---------------------|----------------|--|--|--|--|
| 1:00 | 57°F | C1 | | | | |
| 2:00 | 57°F | C1 | | 749.3 | | 769.3 |
| 3:00 | 57°F | C1 | | | | |
| 4:00 | 58°F | C1 | | 748.3 | | 768.3 |
| 5:00 | 59°F | C2 | | | | |

Add a Note — repair valve
[Save]  [Delete Note]   — 702

| Unit Name | Stage | Edition | Component | HE1 | HE2 | HE3 | HE4 | HE5 | HE6 | HE7 | HE8 | HE9 | HE10 | HE11 |
|---|---|---|---|---|---|---|---|---|---|---|---|---|---|---|
| Power Plant GT1 | 1X1 | Forecast | Low Limit | 145.0 | 145.0 | 145.0 | 145.0 | 145.0 | 145.0 | 145.0 | 145.0 | 145.0 | 145.0 | 145.0 |
| | | | High Limit | 256.0 | 256.0 | 256.0 | 256.0 | 256.0 | 256.0 | 256.0 | 256.0 | 256.0 | 256.0 | 256.0 |
| | | | Min Capacity | 145.0 | 145.0 | 145.0 | 145.0 | 145.0 | 145.0 | 145.0 | 145.0 | 145.0 | 145.0 | 145.0 |
| | | | Max Capacity | 256.0 | 256.0 | 256.0 | 256.0 | 256.0 | 256.0 | 256.0 | 256.0 | 256.0 | 256.0 | 256.0 |
| Power Plant GT1 | 2X1 | Forecast | Low Limit | 298.0 | 298.0 | 298.0 | 298.0 | 298.0 | 298.0 | 298.0 | 298.0 | 298.0 | 298.0 | 298.0 |
| | | | High Limit | 518.0 | 518.0 | 518.0 | 518.0 | 518.0 | 518.0 | 518.0 | 518.0 | 518.0 | 518.0 | 518.0 |
| | | | Min Capacity | 298.0 | 298.0 | 298.0 | 298.0 | 298.0 | 298.0 | 298.0 | 298.0 | 298.0 | 298.0 | 298.0 |
| | | | Max Capacity | 518.0 | 518.0 | 518.0 | 518.0 | 518.0 | 518.0 | 518.0 | 518.0 | 518.0 | 518.0 | 518.0 |
| Power Plant GT1 | 2X1DF | Forecast | Low Limit | 398.0 | 398.0 | 398.0 | 398.0 | 398.0 | 398.0 | 398.0 | 398.0 | 398.0 | 398.0 | 398.0 |
| | | | High Limit | 618.0 | 618.0 | 618.0 | 618.0 | 618.0 | 618.0 | 618.0 | 618.0 | 618.0 | 618.0 | 618.0 |
| | | | Min Capacity | 398.0 | 398.0 | 398.0 | 398.0 | 398.0 | 398.0 | 398.0 | 398.0 | 398.0 | 398.0 | 398.0 |
| | | | Max Capacity | 618.0 | 618.0 | 618.0 | 618.0 | 618.0 | 618.0 | 618.0 | 618.0 | 618.0 | 618.0 | 618.0 |
| | | | Low Limit | 125.0 | 125.0 | 125.0 | 125.0 | 125.0 | 125.0 | 125.0 | 125.0 | 125.0 | 125.0 | 125.0 |

METHODS AND SYSTEMS FOR CONTROLLING GENERATING UNITS AND POWER PLANTS FOR IMPROVED PERFORMANCE

CROSS-REFERENCE TO RELATED APPLICATIONS

This application claims priority to U.S. Provisional Patent Application No. 62/518,446 entitled "System and Method Related to Plant Manager and Trader Optimization Interface" filed on Jun. 12, 2017; which provisional application is incorporated herein by reference in its entirety; this application claims the benefit of the provisional's filing date under 35 U.S.C. 119(e).

BACKGROUND OF THE INVENTION

The present application relates generally to the control of industrial machines and assets. More specifically, but not by way of limitation, the present application relates to controlling industrial machines and assets, particularly those related to power generation industry, via controllers implementing analytics, processes, and graphical screen displays that improve aspects of operational performance.

For example, in regard to the power generation industry, the marketplace typically includes geographically defined power systems within which several competing producers or power plants generate electricity that is distributed over common transmission lines for delivery to customers. Each of the power plants may include several generating units that enable many different generating configurations and possible output levels. While there are many types of generating units, it will be appreciated that thermal generating units—such as gas turbines, steam turbines, and combined-cycle plants—are still prevalently relied on to generate a significant portion of the electrical power that customers require. Power systems typically also include a central governing authority, often referred to as a dispatch authority, that establishes and administers a competitive dispatch process that determines how the anticipated customer load for a future generating period will be divided among and generated by the participant power plants.

As part of the dispatch process, the managers or operators of power plants produce offer curves for submittal to the dispatch authority. Such offer curves represent bids by the power plants and, typically, communicate the anticipated generating cost for the power plant during the upcoming generating period, for example, indicating an incremental variable cost curve or some other suitable indication of variable generating expense. The dispatch authority then analyzes the submitted offer curves to determine the level at which to engage each power plant that most effectively satisfy the predicted load demand of the customers. In doing this, the dispatch authority may consider many factors, including the reliability of the different power plants, with a primary goal being to utilize the available power plants in a way that achieves the lowest generating cost for the customers. Once this is done, the dispatch authority produces a commitment schedule for the power plants that describes with specificity the extent to which each will be engaged in the upcoming generating period.

To operate successfully within this type of competitive environment, participant power plants must be able to achieve high levels of operational efficiency and cost-effectiveness. Additionally, plant operators must be able to call upon accurate, real-time data informing them of the current performance characteristic of their power generating machinery. This gives operators the ability to bid their power plant's actual capabilities without having to include large error margins in the offer curves they submit to the dispatch authority, which allows their bids to be as competitive as possible. Without such knowledge, such error margins typically needed to reduce the risk of overbidding the power plant during the dispatch process, which can be a costly mistake for the power plant because it may force the plant to operate inefficiently to satisfy the commitment schedule. If, however, those error margins can be reduced or minimized without increasing such risks by providing operators with more accurate and timely intelligence regarding the actual performance capabilities of their plants, this reduction translates directly into making their dispatch bids more competitive. As will be seen, one or more aspects of the present application may be employed toward improving power plant efficiency and cost-effectiveness and/or enhancing operator intelligence around the true generating capabilities of their power plants.

Once the commitment schedule is communicated to the power plants, the objective of each is to generate the committed output in a manner that maximizes economic return. As will be appreciated, given the growing complexity of the modern power plant, this objective is becoming particularly challenging. This complexity is the product of many factors. For example, power plants now typically include many different generating units of varying types, and these enable numerous alternative generating configurations, with each of these alternatives attending its own set of economic considerations. Each of these generating units also must be maintained according to its own maintenance schedule that requires regular outages that must be carefully planned so to not unnecessarily impact plant operations. In addition, the power industry is a heavily regular one, with numerous laws and regulations affecting how power plants can be operated. And, of course, fluctuating market conditions make short- and long-term profitability a moving target. While modern power plants typical include both unit-level and plant-level control systems for addressing some of these operational issues, in many ways, these control systems are inadequate because they do not fully leverage the growing data-intensive aspects of the industrial world. Specifically, current control systems have been unsuccessful at realizing the level of industrial optimization that the growing availability of operational data make possible, and this failure results in power plants and generating units being operated inefficiently and without maximizing economic return. As will be seen, one or more aspects of the present application address these operational shortcomings.

More generally, as digital and industrial environments become more fully integrated and data-intensive, many of these issues are similarly applicable to other types of industrial plants. As with power plants, other large industrial assets or plants have become increasing complex, yet slow to fully marshal the available technology toward achieving the gains in efficiency that are possible. Most of today's industrial plants are assembled from many disparate types of industrial machines, control systems, and other assets, which are supplied by a myriad of different manufacturers. While each of these different components may be adequately designed to perform particular tasks, the overall success of the plant depends upon them being seamlessly integrated so that their combined function is both efficient and highly productivity. This presents very difficult design and operational challenges.

A long-preferred solution for driving the operation of such industrial plants has been integrated software and hardware-based controllers. However, with the rise of inexpensive cloud computing, increasing sensor capabilities and decreasing sensor costs, as well as the proliferation of mobile technologies and networking capabilities, new possibilities have arisen to reshape how industrial plants and other assets are designed, operated, and maintained. For example, recent advances in sensor technologies now enable the harvesting of new types and vastly more operational data, while progress in network speed and capacity allows essentially real-time transmission of this data to distant locations. This means, for example, that even for geographically dispersed fleets of similar assets, data gathered at each remote site can be efficiently brought together, analyzed, and employed in ways aimed at improving both fleet, plant, or individual asset performance. As a consequence of this evolving and data-intensive environment, new opportunities arise to enhance or optimize the value of industrial plants and assets through novel industrial-focused hardware and software solutions. Such solutions would have value and utility and are a subject of the present disclosure.

BRIEF DESCRIPTION OF THE INVENTION

The present application thus describes a system including: a power plant that includes thermal generating units that are engageable according to a plurality of generating configurations for generating a plurality of output levels during a generating period, wherein, during the generating period, a generating plan schedules a selection of a generating configuration from the plurality of generating configurations and an output level from the plurality of output levels for the power plant; a hardware processor; a first user device used by a first user; a second user device that used by a second user; and a machine-readable storage medium on which is stored instructions that cause the hardware processor to execute a process related to controlling the power plant during a future generating period. The process may include the steps of: presenting on the first user device a proposed version of the generating plan for the future generating period; receiving at the first user device a user input making a first modification that modifies an aspect of the proposed version of the generating plan and, thereby, creates a bid version of the generating plan; presenting on the second user device the bid version of the generating plan so that an indicator indicates the aspect that was modified by the first modification; receiving a user input on the second user device for creating a bid for a power plant fleet for generating a fleet capacity during the future generating period, wherein the bid is based, at least in part, on the bid version of the generating plan, and wherein the power plant fleet comprises the power plant and one or more other power plants; transmitting from the second user device the bid to a predetermined destination for participating in a bidding process that determines the fleet capacity during the future generating period; receiving at the second user device a response to the bid, the response comprising an awarded fleet capacity for the future generating period; and transmitting from the second user device to the first user device an awarded plant-level capacity that is based on the awarded fleet capacity for the power plant fleet.

The present disclosure further describes a method for controlling a power plant that includes: presenting on a first user device a proposed version of the generating plan for a future generating period; receiving at the first user device a user input making a first modification to the proposed version to create a bid version of the generating plan; presenting on a second user device the bid version of the generating plan so that an indicator indicates the aspect that was modified by the first modification; receiving a user input on the second user device for creating a bid based on the bid version of the generating plan; transmitting from the second user device the bid to a predetermined destination; receiving at the second user device a response comprising an awarded fleet capacity; and transmitting from the second user device to the first user device an awarded plant-level capacity based on the awarded fleet capacity.

These and other features of the present application will become more apparent upon review of the following detailed description of the preferred embodiments when taken in conjunction with the drawings and the appended claims.

BRIEF DESCRIPTION OF THE DRAWINGS

FIG. 7 provides an example graphical representation displaying power plant data in accordance with embodiments of the present disclosure;

FIG. 10 provides an example graphical representation displaying power plant data in accordance with embodiments of the present disclosure;

DETAILED DESCRIPTION OF THE INVENTION

Example embodiments will be described more fully hereinafter with reference to the accompanying drawings, in which some, but not all embodiments are shown. Indeed, embodiments of the present disclosure may take many different forms and should not be construed as limited to the embodiments set forth herein. Like numbers may refer to like elements throughout.

Figure 1:
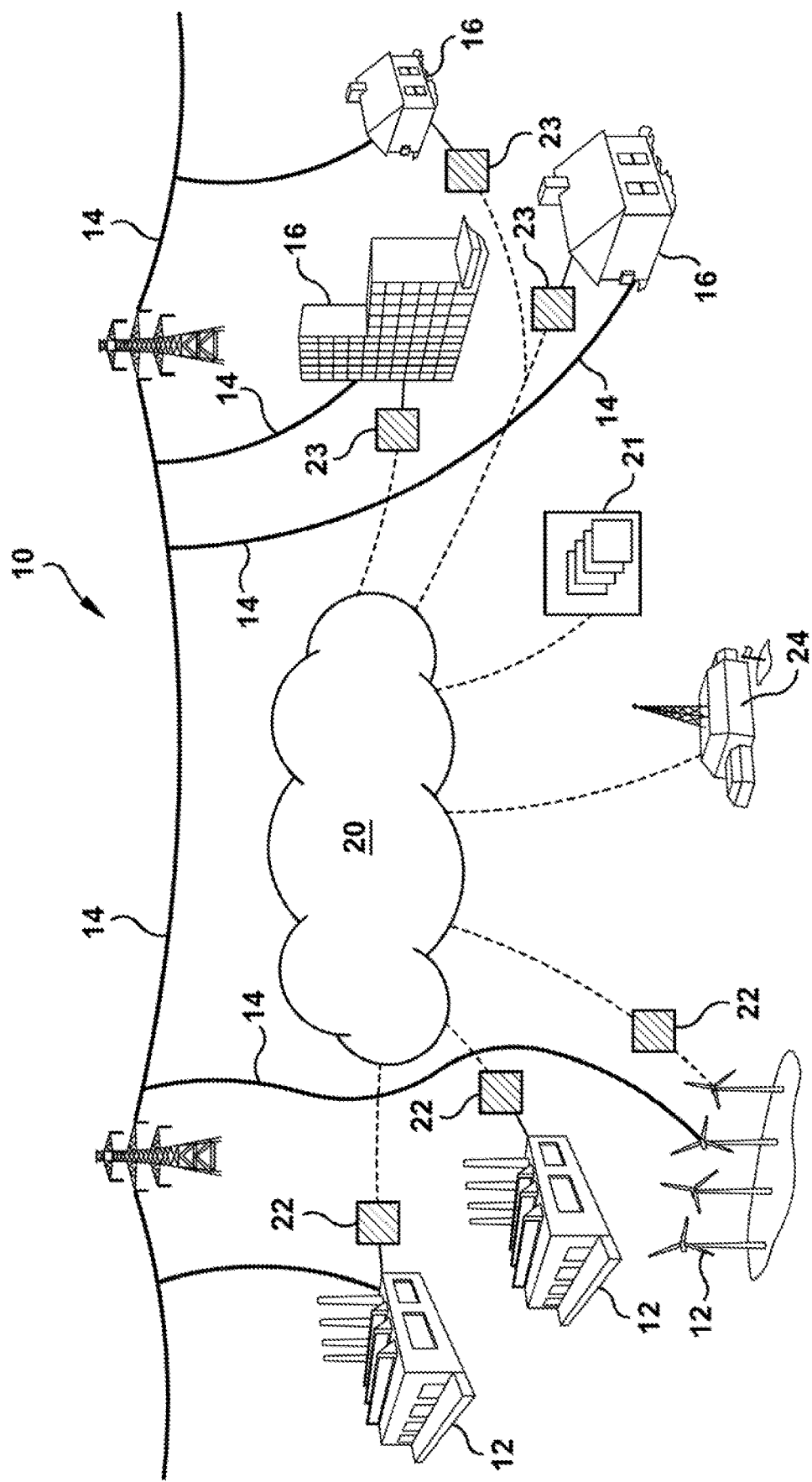
FIG. 1 shows a schematic diagram of a power system according to aspects of the present disclosure or within which embodiments of the present disclosure may be used.

FIG. 1 illustrates a schematic representation of a power system 10 illustrating an exemplary power system environment within which embodiments of the present disclosure may operate. Power system 10 includes several power plants 12 for generating electrical power. Such power plants 10 may include wind and thermal power plants 12, as shown, but also may include other types of power plants, for example, solar power, hydroelectric, geothermal, or nuclear power plants. Within power system 10, common transmission lines 14 connect power plants 12 to one or more loads or customers 16, which, for example, may include municipalities, residential, and industrial customers. Transmission lines 14 represent the distribution network or power grid of power system 10 and may include multiple sections or substations as appropriate.

Power system 10 also includes control systems or controllers that manage or control the operation of several of the components contained therein. For example, a plant controller 22 may control the operation of power plant 12 and the generating units included therewithin, while load controllers 23 may control the manner or timing of power purchases by customers 16. Power system 10 also includes a central authority, or dispatch authority 24, that manages the dispatch process by which load commitments are distributed among power plants 10 for satisfying customer demand. Controllers 22, 23 may be connected via communication lines to communication network 20 over which data is exchanged. Communication network 20 may be connected to or part of a communications networks, such as the internet, private networks, or cloud networks. In addition, controllers 22, 23 may receive information, data, and instructions from and/or send information, data, and instructions to data libraries and resources (or "data resources 21") through communication network 20. Controllers 22, 23 also may store or house data repositories locally. Data resources 21 may include several types of data, including but not limited to market data, operational data, performance data, and ambient conditions data.

In operation, for example, power plants 12 generate electricity that is distributed over common transmission lines 14 for delivery to customers 16. Pursuant to a dispatch process, which is administered by dispatch authority 24, power plants 12 compete against each other to determine how each will be engaged to satisfy the anticipated load requirements of customers 16 during a future generating period. During the dispatch process, operators of power plants 12 generate offer curves that include generating cost for the future generating period. The offer curves represent bids by power plants 12 for the future generating period, and typically include an incremental variable cost curve or some other suitable indication of variable generating expense, which, for example, may be expressed in dollars per megawatt-hour versus output in megawatts. Dispatch authority 24 then uses the received offer curves to divide the anticipate load requirements for the future generating period among power plants 12. For example, dispatch authority 24 may employ a competitive process known as economic dispatch to determine the level at which to engage each power plant 12 that most efficiently satisfies the predicted load requirements of power system 10. In doing this, a primary objective of the dispatch authority 24 is to find the lowest generating cost that satisfies anticipated customer demand. Once this is done, dispatch authority 24 issues a commitment schedule to power plants 12 that specifically describes the manner in which each will be engaged over the future generating period.

Once the commitment schedule is communicated to power plants 12, the objective of each is to generate the committed output in a manner that maximizes economic return. As will be appreciated, given the growing complexity of the modern power plant, this objective is becoming particularly challenging. This complexity is the product of many factors. For example, power plants now typically include many different generating units of varying types, and these enable numerous alternative generating configurations, with each of these alternatives attending its own set of economic considerations. Each of these generating units also must be maintained according to its own maintenance schedule that requires regular outages that must be carefully planned so to not unnecessarily impact plant operations. In addition, the power industry is a heavily regular one, with numerous laws and regulations affecting how power plants can be operated. Finally, of course, fluctuating market conditions make short- and long-term profitability a moving target. While conventional control systems may be proficient at addressing some these issues—for example, executing scheduling algorithms by which fuel flow, inlet guide vanes settings, and other inputs are adjusted—the actual output and efficiency of a power plant is regularly impacted by external factors, such as variable ambient conditions or unplanned outages, that cannot be fully anticipated. As will be appreciated, the growing complexity of power plants and the variability of operating conditions make it difficult to predict and control performance, which often results in inefficient operation. Further, conventional control systems are often inadequate because they do not fully leverage the growing data-intensive aspects of the industrial world. Specifically, current control systems have been unsuccessful at realizing the level of industrial optimization that the growing availability of operational data make possible, and this failure results in power plants and generating units being operated inefficiently and without maximizing economic return.

In addition, performance degradation is another factor that is difficult to quantify, but one that significantly impacts plant operations and economic return. More specifically, because the performance of the generating units and machinery of power plants degrades over time, it must be accounted for when dispatching the units and understood in assessing the cost-effectiveness of the plant. However, the rate at which a gas turbine degrades varies according to many factors, including hours of operation, load, operating configuration, transient operation, and number of starts. Yet many of these factors are interrelated and affect degradation in ways that are not fully understood. As an example, hours-based life in a gas turbine may be prolonged by reducing firing temperatures, however, this alternative reduces efficiency, which increases fuel costs. Conversely, increasing the firing temperature increases efficiency, but shortens component life and increases costs for maintenance and part replacement. In a similar way, decisions related to turn down, shut down, and rapid ramping impact life consumption of machine components and fuel costs. Further, grid compliance and dispatching may be adversely impacted by controlling the plant's generating units in an overly-static manner, i.e., through the use of static control profiles, such as heat rate curves, derived from periodic performance tests. Between such updates, unit performance may have degraded to the point where the control profiles are obsolete.

To compensate for all this variability, power plant operators often become overly conservative in planning for future generating periods, which results in bidding practices that make their units less competitive and underutilized capacity. To do otherwise risks bidding the plant beyond its current performance capabilities, which may force an operator to operate units inefficiently to satisfy load commitments. Thus, because of the many complex and interrelated factors, operators still struggle to manage life cycle costs and economic return associated the generating units of power plants. The extent to which these factors can be better understood and the related trade-offs more effectively balanced can directly translate into improved economic performance of the power plant. That is, without understanding and identifying short-term inefficiencies and long-term deterioration, conventional power plant control systems must rely on being frequently retuned, which can be a costly result, or being bid and operated conservatively, which often negatively impacts the cost-effectiveness of the plant.

Integrated software and hardware-based controllers have long been the preferred solution for driving the operation of industrial assets and machines, such as those within power plant 12. However, with the rise of inexpensive cloud computing, increasing sensor capabilities and decreasing sensor costs, as well as the proliferation of mobile technologies and networking capabilities, new possibilities have arisen to reshape how power plants and generating units are designed, operated, and maintained. For example, recent advances in sensor technologies now enable the harvesting of new types and vastly more operational data, while progress in network speed and capacity allows essentially real-time transmission of this data to distant locations. This means, for example, that even for geographically dispersed fleets of similar assets, data gathered at each remote site can be efficiently brought together, analyzed, and employed in ways aimed at improving both fleet and individual asset performance. As a consequence of this evolving and data-intensive environment, new opportunities arise to enhance or optimize the value of industrial assets through novel industrial-focused hardware and software solutions. However, conventional control systems fail to realize the level of industrial asset optimization made possible by the new types and increased amounts of available operational data.

In sum, these issues generally result in industrial assets, such as power plants and generating units, being operated in ways that fail to maximize efficiency and economic return. With reference now to the following figures, embodiments of the present disclosure will be disclosed that address one or more aspects related to these ongoing problems.

Figure 2:
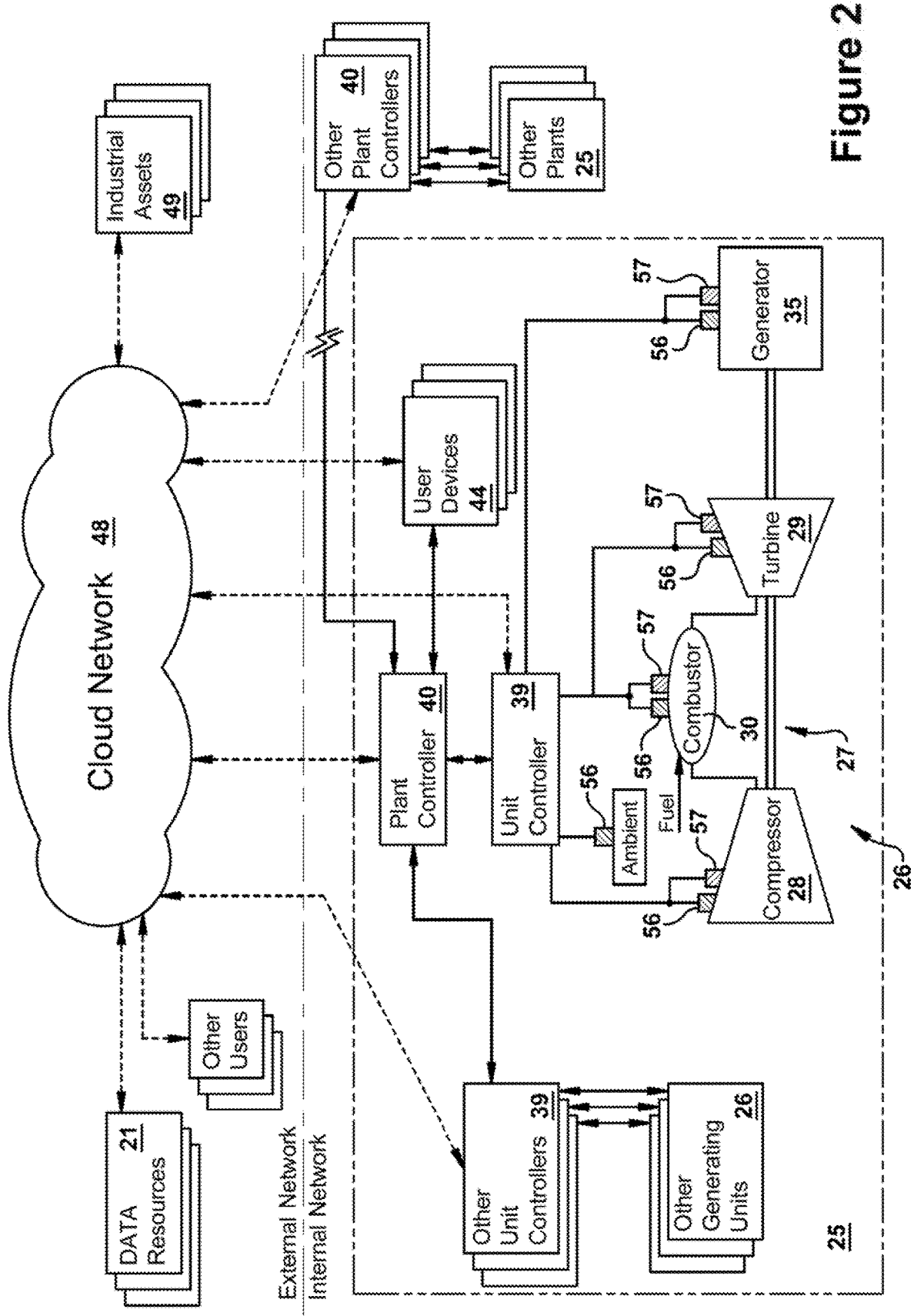
FIG. 2 provides a schematic illustration of an exemplary distributed computing network and power plant having a gas turbine, which includes a computer-implemented control system and network resources in accordance with embodiments of the present application or exemplifying an environment within which such embodiments are enabled or practiced.

FIG. 2 provides a schematic illustration of an exemplary distributed computing system or network within an industrial environment in which an exemplary type of power plant, a power plant 25, has one or more generating units 26. As will be seen, power plant 25 and generating units 26 may be networked via internal and/or external networks to control systems, controllers, and other resources, in accordance with embodiments of the present disclosure or exemplifying a networked industrial environment within which such embodiments are enabled or can be practiced. FIG. 2 also exhibits an exemplary system by which operational data may be collected in relation to any industrial asset, and then analyzed and used for the control and management of that industrial asset.

As an exemplary type of generating unit 26, power plant 25 is shown as including a combustion or gas turbine 27, however it should be appreciated that it may include other generating units 26 of varying types. Generating units 26 may be monitored by a variety of sensors that collect and transmit data to local and remote computer systems for analysis thereby, as well as control and operational feedback therefrom. Gas turbine 27 may include a compressor 28 coupled by a common shaft to a downstream turbine section or turbine 29, with a combustor 30 being positioned therebetween. In one example of operation, the rotation of rotor blades within compressor 28 compresses a flow of air. Within combustor 30, energy is released when the compressed air is mixed with a fuel and ignited, with the resulting flow of hot gases, or working fluid, being directed over rotor blades within turbine 29, which induce the shaft to rotate. In this way, the energy within the working fluid is transformed into rotating the shaft, which then, for example, may be used to drive the coils of a generator 35 to produce electricity.

Power plant 25 may include any number of subsystems, components, generating units 26, or industrial assets, each of which may be connected to computer-implemented control systems and communication networks for the control and performance optimization pursuant to analytics, processes, and other functionality described herein. For example, within such control systems, operational data may be collected and provided electronically to computer-implemented analytics, data repositories, plant or unit controllers, cloud-based services, and/or user interfaces or input devices (or "user devices") so to enable a variety of functions. Such functions may include deriving control setpoints for operating an industrial asset, data storage/recall, generating graphical user interfaces, prompting/obtaining user input, decision support for long-term and short-term operations, automated control responses, and others, as may be provided herein. Thus, the networked computing systems, controllers, and related computing resources of FIG. 2 may send/receive electronic communications to/from each of the systems, subsystems, components, sensors, actuators, user devices, and/or other equipment within power plant 25 and included generating units 26, as well as manipulate control settings related thereto, in a manner consistent with functionality described herein, whether that functionality is explicitly stated or implicit given the appended claims, as would be understood by a person of ordinary skill in the art.

As shown, each of the generating units 26 may include a control system or controller (or "unit controller 39"), that monitors and controls operation. Unit controller 39 may fulfill a variety of control requirements as well as protecting against adverse or abnormal operating conditions. For example, unit controller 39 may perform many functions, including fuel, air and emissions control, sequencing of fuel for start-up, shut-down and cool-down, synchronization and voltage matching of generator 35, monitoring gas turbine control and auxiliary functions, and protection against unsafe and adverse operating conditions, as well as other functionality, as may be described or implied herein. A plant controller 40 also may be provided that communicates with each of unit controllers 39. Plant controller 40 generally controls aspects relating to the overall operation of power plant 25. Plant controller 40 may further connect to other plant controllers 40 associated with the operation of other power plants 25, such that multiple power plants 25 within a power plant fleet can communicate, trade information, and be controlled as a group.

Unit controller 39 and plant controller 40—which also may be referenced herein collectively as "controllers"—each may include a computer system having digital processors or processing resources (or "processor") as well as machine-readable storage medium or memory capabilities (or "memory"). Alternatively, unit controller 39 and plant controller 40 may be combined into a single controller having an integrated architecture. Unit controller 39, plant controller 40, and the computer system related to each may connect to one or more user devices 44. Such connections, as illustrated, may be made through internal and/or external networks. User devices 44 may be configured to receive and send communications from/to any personnel associated with the operation of power plant 25 or generating unit 26. User devices 44 may include any conventional device having a user interface, without limitation, including mobile devices, laptops, and other workstations, whether locally or remotely disposed relative to the location of power plant 25 or generating unit 26.

The computer systems related to controllers 39, 40 each include one or more processors, memory, and other conventional computing componentry as may be required given any of the functionality described herein. For example, the computer systems of controllers 39, 40 may include non-local aspects distributed throughout the several other resources, devices or nodes depicted in FIG. 2. Such nodes may include, without limitation, a communication network, cloud or cloud-based platform (or, as shown, "cloud network 48" or, more generally, "cloud"); data repositories or other informational resources (or, as shown, "data resources" or "data resources 21"); the several user devices 44; and other unit controllers 39, plant controllers 40, and industrial assets 49, as may be necessary to achieve any of the functionality described herein. It should be understood that the consolidated and localized depiction of controllers 39, 40 in FIG. 1, as well as the computer systems, processors, and memory resources related to each, is merely exemplary and not meant to limit the manner in which any described functionality is executed, unless otherwise stated. Along these lines, it should be further appreciated that reference to unit controller 39, plant controller 40, user devices 44 and/or the computer systems associated with each may include computing resources—such as processing, storage, memory, data and communication devices—which are distributed and accessible via internal or power plant level networks, as well as by cloud network 48, as would be understood by one of ordinary skill in the art given the nature of state of the art distributed computing environments and the functionality described herein, whether that functionality be expressly stated or implied.

Gas turbine 27, as well as any of the other generating units 26, may include multiple sensors 56 that are configured to monitor particular operational aspects of gas turbine 27 by detecting or measuring operating conditions or parameters throughout the engine as it operates. For example, sensors 56 may include temperature sensors, pressure sensors, velocity sensors, flame detector sensors, valve position sensors, as well as any other conventional sensor anticipated given the functionality described herein. As used herein, the term "parameter" refers to measurable physical properties of operation which collectively may be used to define operating conditions within a system. Such operating parameters may include, without limitation, temperature, pressure, humidity, gas flow characteristics, ambient conditions, fuel characteristics, and other measurables, as may be described or implied by the functionality described herein.

Gas turbine 27, as well as any of the other generating units 26, may include several actuators 57 by which control of gas turbine 27 is achieved. For example, actuators 57 may include electro-mechanical devices having variable setpoints or settings that allow for the manipulation of certain process inputs—herein "manipulated variables"—for the control of process outputs herein "controlled variables"—in accordance with a desired result or mode of operation. The control of the manipulated variables via actuators 57 must take into account other non-controllable variables—herein "disturbance variables"—which also affect the operation of gas turbine 27. Thus, for example, commands generated by controllers 39, 40 may cause one or more actuators 57 within gas turbine 27 to adjust valves between a fuel supply and the combustor 30 to regulate flow level, fuel splits, or fuel type.

As will be appreciated, the computer systems of FIG. 2, such as controllers 39, 40, execute code or software programs or applications (or "software") that are configured to control generating units 26 and/or power plant 25 according to a desired mode of operation or to maximize predefined performance objectives. Such control may be responsive to operational data supplied by sensors 56 and/or instructions received from user devices 44, and such control may be implemented via manipulating one or more actuators 57. In furtherance of this, user devices 44 may be accessed and used by plant managers, technicians, engineers, operators, energy traders, owners, and/or other stakeholders, as may be described or implied by any of the functionality provided herein. The software may include schedules, analytics, and algorithms for regulating any of the systems or subsystems described herein.

In general, cloud network 48 includes an external or wide-area network, which connects power plant 25 to other power plants 25, industrial assets 49, and data resources 21. A more secure local area or internal network may also be provided that connects local resources. The connections made between cloud network 48 and any of the other nodes or devices of FIG. 2 may be wired or wireless and/or inclusive of any state of the art communication systems or devices. As will be appreciated, cloud network 48 may be part of a larger communication system or network, including the Internet and/or one or more private computer networks. In this manner, controllers 39, 40 may receive information, data, and instructions from and/or send information, data, and instructions to data resources 21. Connection to such data resources 21 may be made via cloud network 48 or, alternatively, one or more of the data resources 21 may be stored locally and be accessed outside of cloud network 48 via a private or internal network. Additionally, as discussed more below, cloud network 48 may connect gas turbine 27 to other industrial assets 49, such as other remote gas turbines, power plants, or the facilities of suppliers or customers.

Data resources 21 may include any type of data implied by the functionality described herein. For example, data resources 21 may include, but not limited to the following types of data: market data, operational data, and ambient conditions data. Market data, for example, may include information on market conditions, such as energy sales price, fuel costs, labor costs, regulations, etc. Operational data, for example, may include information relating to the operating conditions of power plant 25, gas turbine 27 or related components. Such operational data may include temperature or pressure measurements, air flow rates, fuel flow rates, etc. within gas turbine 27. Ambient condition data, for example, may include information related to ambient conditions at power plant 25, such as ambient air temperature, humidity, and/or pressure. Market, operating, and ambient conditions data each may include historical records, present condition data, and/or data relating to forecasts. For example, data resources 21 may include present and forecast meteorological/climate information, present and forecast market conditions, usage and performance history records about the operation of power plant 25 or gas turbine 27, and/or measured parameters regarding the operation of other similarly situated power plants or gas turbines, which may be defined as those having similar components and/or configurations. Other data, as may be described or implied by the functionality described herein, also may be stored and recalled from data resources 21 as needed.

Thus, according to exemplary embodiments, it should be understood that, while each of controllers 39, 40 may include computer systems having a processor, memory, databases, communication devices, and other computing resources, it should be appreciated that these resources may be distributed, for example, across any of the several nodes or devices depicted in FIG. 2, including controllers 39, 40, user devices 44, cloud network 48, data resources 21, other industrial assets 49, etc. While certain aspects of controllers 39, 40 may be locally disposed, other aspects may be remote and operationally connected via cloud network 48, as indicated by the dotted lines of FIG. 1. As stated, controllers 39, 40 may be connected, directly or indirectly, to each piece of equipment, subsystem, or component within the power plant, including gas turbine 27 and related subsystems, such that sensors 56 deliver data to the controllers and actuators 57 are responsive to commands received from the controllers. Unless otherwise stated, however, present systems and methods may include embodiments that are not configured to directly control the gas turbine or other generating unit and/or to directly measure operating conditions. In those presently described embodiments that do directly measure/control operation of gas turbine 27 or other generating unit 26, such control may be made pursuant to software or a "control program", which may be stored, in whole or in part, within the memory of the computer systems of unit controller 39 and/or plant controller 40 and, when operated, makes the computer systems thereof manage data and perform the processes, analytics, and logic as provided herein.

According to an exemplary manner of operation, a processor of the computer systems of the controllers executes software or program code (herein "program code") that defines the control program. While executing the program code, the processor processes data, which results in reading and/or writing transformed data from/to memory. Displays on user devices 44 may enable a human user (also "operator" or "end user"), such as any of those described herein, to interact with any of the computer systems using a communications link, such as cloud network 48. As will be appreciated, cloud network 48 may enable the computer system to communicate with any of the other devices described herein, regardless of location. To this extent, the control program of the present disclosure may manage a set of interfaces that enable several users to interact with the control program. Further, the control program, as discussed further below, may manage (e.g., store, retrieve, create, manipulate, organize, present, etc.) data, such as control data or operational data. The controllers may include one or more general purpose computing articles of manufacture capable of executing the program code of the control programs once it is installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, the program code may include object code, source code, and/or executable code, and may form part of a computer program product when on computer readable medium. It is understood that the term "computer readable medium" may comprise one or more of any type of tangible medium of expression, now known or later developed, from which a copy of the program code may be perceived, reproduced, or otherwise communicated by a computing device.

As will be appreciated, when the computer executes the program code, it becomes an apparatus for practicing the invention, and on a general-purpose microprocessor, specific logic circuits are created by configuration of the microprocessor with computer code segments. For example, a technical effect of the executable instructions may be to implement a control method and/or system and/or computer program product that uses models to enhance, augment or optimize operating characteristics of industrial assets to improve economic return given a set of constraints, such as ambient conditions, market conditions, performance parameters, life cycle costs, etc. In addition to using current information, historical and/or forecast information may be employed, and a feedback loop may be established to dynamically operate the generating unit and/or power plant more efficiently during fluctuating conditions. The computer code of the control program may be written in computer instructions executable by the computer systems of the controllers. To this extent, the control program executed by the controllers and/or other distributed computer resources may be embodied as any combination of system software and/or application software. Further, the control program may be implemented using a set of modules. In this case, a module may enable the controllers to perform a set of tasks used by control program, and may be separately developed and/or implemented apart from other portions of control program. As will be appreciated, when the computer system executing the control program includes multiple computing devices, such as previously described, each computing device may have only a portion of control program or program code fixed thereon.

Thus, generally, the control program may enable computing and digital resources—such as those specifically described herein or which may be generally referred to as a "computer system"—to implement a unit controller or plant controller in accordance with the functionality provided here, particularly those figures to follow that include data flow diagrams, algorithms, methods, analytics, and/or logic. For purposes herein, such a computer system may obtain data via any conventional means. For example, such a computer system may calculate control data for a generating unit or power plant, retrieve control data relating to a generating unit or power plant from one or more data stores, repositories or sources, and/or receive control data for a generating unit or power plant from other systems or devices in or outside of the locality of the generating unit or power plant. In other embodiments, the present application may include methods of providing a copy of the program code, such as for executing the control program, which may include the implementation of some or all the processes described herein. It should be further understood that aspects of the present disclosure may be implemented as part of a business method that performs a process described herein on a subscription or fee basis. For example, a service provider may implement the control program at a customer's generating unit or power plant. In such cases, the service provider may manage the computer system or controllers that performs one or more of the processes described herein for the customer facility.

Figure 3:
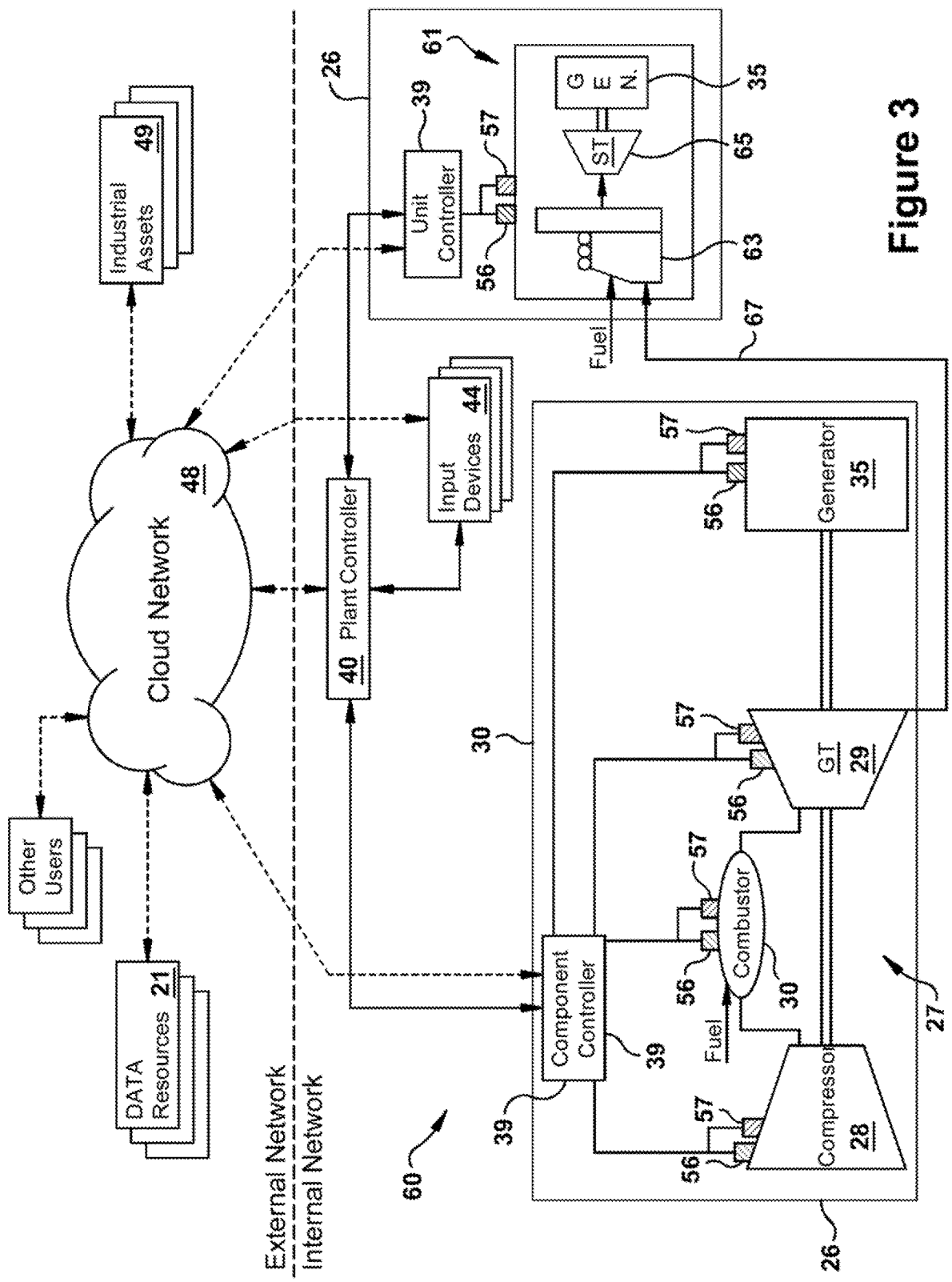
FIG. 3 provides a schematic illustration of an exemplary distributed computing network and power plant having a combined cycle configuration, which includes a computer-implemented control system and network resources in accordance with embodiments of the present application or exemplifying an environment within which such embodiments are enabled or practiced.

Turning now to FIG. 3, a schematic illustration of an exemplary distributed computing system or network is provided in relation to an alternative type of power plant, a power plant 60, having one or more generating units 26. Similar to what is provided above in relation to power plant 25, power plant 60 and its included generating units 26 may be networked via internal and/or external networks to control systems, controllers, and other resources, in accordance with embodiments of the present disclosure or exemplifying a networked industrial environment within which such embodiments are enabled or can be practiced. More broadly, FIG. 3 provides an exemplary system by which operational data of an industrial asset may be collected, analyzed, and employed toward the control and management of that industrial asset.

As will be appreciated, power plant 60 is a combined cycle power plant having a plurality of generating units 26. As shown, power plant 60 includes a gas turbine 27 operably linked to a steam turbine system 61. As will be appreciated, power plant 60 represents a common thermal power plant configuration, and, taken together with the description above related to power plant 25, may be referred to in the discussion of exemplary embodiments of the present disclosure. It should be appreciated, however, that the present disclosure may be more generally applicable to other types of power plants, generating units, or industrial assets, as well as scalable to larger power plants or fleets having numerous such power plants or generating units. In understanding FIG. 3, it should be understood that description of like-number components already introduced herein may be limited to avoid unnecessary repetition.

As shown in FIG. 3, the combine cycle system of power plant 60 includes a gas turbine 27 operably connected to steam turbine system 61. To augment the power generating capabilities of power plant 60, a duct firing system 63 may be optionally included. Each of gas turbine 27 and steam turbine system 61 may be connected to a unit controller 39, with each of the unit controllers 39 connecting to a plant controller 40. Further, as already discussed, unit controllers 39 may communicate electronically with sensors 56 and actuators 57 dedicated to each generating unit 26 for the control thereof. Plant controller 40 may connect with each unit controller 39 and, via the connection, also may communicate with sensors 56 and actuators 57 associated with each generating unit 26. In general, controllers 39,40 may control power plant 60 subject to the factors and criteria discussed above, for example, instructions received from user devices 44, data received from data resources 21, and readings taken by sensors 56.

Gas turbine 27 of FIG. 3 may operate in a manner similar to that already discussed. Steam turbine system 61 includes a system in which a steam turbine section or steam turbine 65 operably connects via a shaft to a generator 35. In operation, generally, steam turbine system 61 receives an exhaust flow 55 that is directed to it from an outlet of gas turbine 27. Then, using the heat of exhaust flow 55, steam turbine system 61 produces steam that is then expanded through steam turbine 65. Duct firing system 63 may be optionally provided for adding energy to exhaust flow 55 so that generating capacity is increased via the resulting increase in steam production. Within turbine 65 of steam turbine system 61, the expansion of the steam induces rotor blades housed therein to rotate and, in this way, the energy of the expanding steam is transformed into mechanical energy of the rotating blades. The rotor blades transfer this energy to the shaft on which they are mounted, and this shaft, for example, may be used to drive generator 35 so to generate electricity. Controllers 39,40 may control the operation of gas turbine 27 and steam turbine system 61, for example, controlling the flow rate that fuel is delivered to combustor 30 and duct firing system 63. With reference again to power system 10 of FIG. 1, the electricity generated by generators 35 may be delivered to customers 16 via transmission lines 14.

Figure 4:
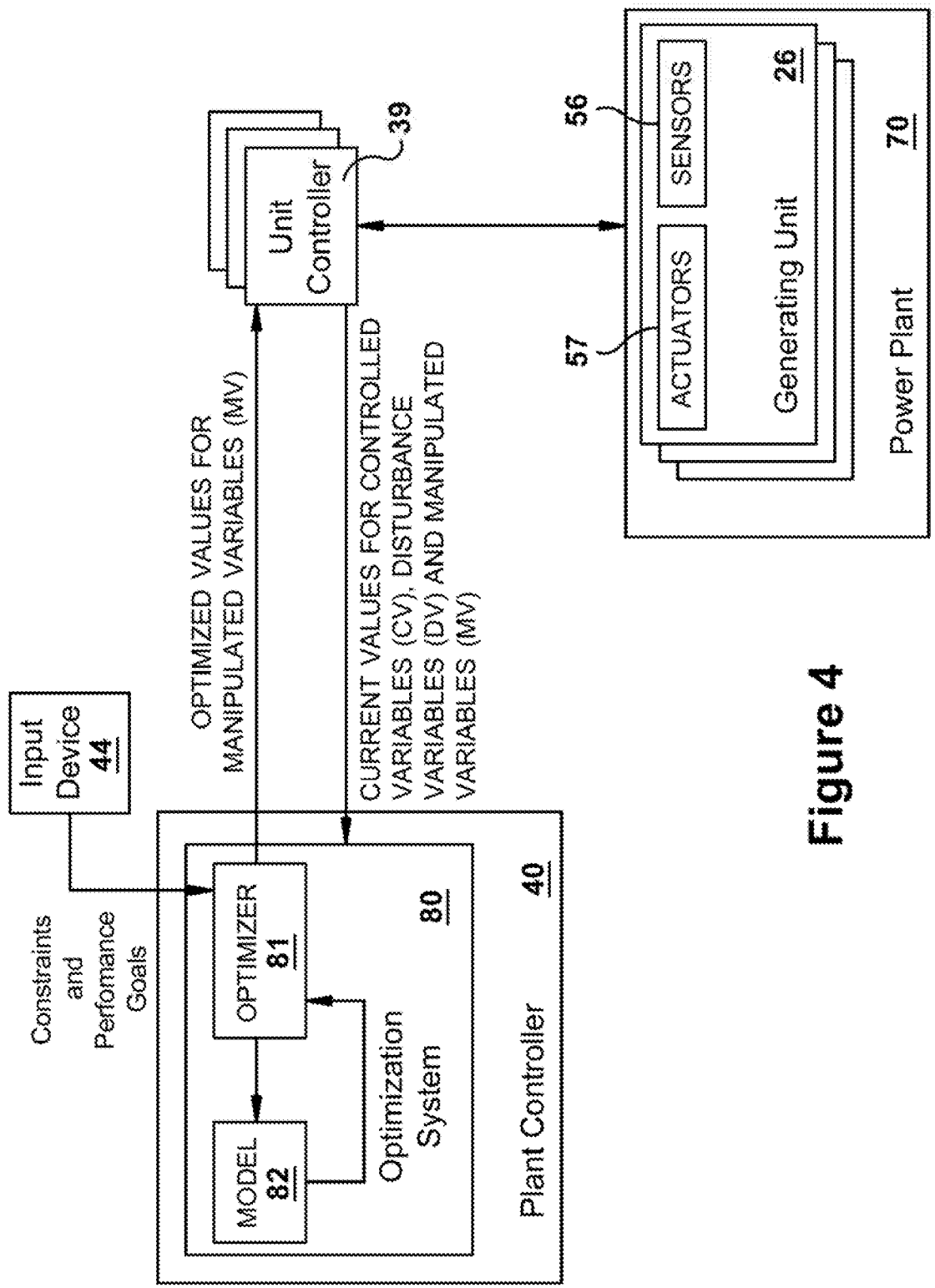
FIG. 4 provides a block diagram illustrating aspects of an optimization method and system in accordance with exemplary embodiments of the present disclosure.

FIG. 4 illustrates a block diagram representing an exemplary system for optimizing the operation and/or generating configuration of an exemplary power plant 70, which may be similar to any of the above described power plants 25,45, and/or one or more exemplary generating units 26, such as any of the above-described generating units 27,61. In the illustration provided, an optimization system 80 is comprised of an optimizer 81 and a model 82. Though alternative configurations are also possible, the optimization system 80 may be integrated into plant controller 40. As part of plant controller 40, optimization system 80 may communicate with unit controllers 39 of generating units 26 of power plant 70 and, thereby, provide supervisory control for power plant 70 and/or issue control commands for particular generating units 26. Unit controller 39, plant controller 40, and optimization system 80 may take the form of a computer-implemented control systems or programmable logic controller. A user device 44 may provide means for an operator or manager to communicate with plant controller 40 and/or optimization system 80 for communicating constraints and performance goals for controlling the power plant 70 and/or generating units 26. As described above, generating units 26 each may include a plurality of sensors 56 and actuators 57.

Model 82 may be a computer-implemented model of power plant 70 and/or may include computer-implemented models for each of generating units 26. As will be appreciated, model 82 is used to represent the relationship between manipulated variables, disturbance variables, and controlled variables for generating units 26 and power plant 70. Manipulated variables represent those variables that may be changed by an operator or optimization system 80 to affect the controlled variables. In the case of gas turbines, for example, manipulated variable may include fuel flow, fuel splits, and inlet guide vane settings. In the case of steam turbines, for example, manipulated variable include overfired air damper position, secondary air damper position biases, fuel mill speed biases, primary air biases, and fuel flow to a duct burner system. Disturbance variables refer to variables that affect the controlled variables of generating units 26, but that cannot be manipulated or controlled by an operator. For example, disturbance variables of thermal generating units may include ambient conditions and fuel characteristics.

Optimization system 80 may be applied at a unit level optimization, for example, modeling the operation of generating units to optimize performance, or a plant level optimization, for example, modeling plant operation to optimize generating configurations. At the unit level, for example, optimization system 80 generally functions by determining an optimal set of setpoint values for the manipulated variables given a desired performance goal (e.g., minimizing NOx production) and constraints (e.g., limits on emissions) associated with operation of generating unit 26. More specifically, at a predetermined frequency per a defined optimization cycle, optimization system 80 may obtain the current values of manipulated variables, controlled variables and disturbance variables from unit controller 39 for generating unit 26. Optimization system 80 then may use model 82, which is configured to model the operation of generating unit 26, to determine an optimal set of setpoint values for the manipulated variables based upon current conditions of generating unit 26. The optimal set of setpoint values may then be sent to unit controller 39 for implementation. Optimization system 80 may run in a closed loop adjusting the setpoints values of the manipulated variables at a predetermined frequency according to a recurring optimization cycle.

At the plant level, optimization system 80 may operate according to the same general principles to optimize plant operations and performance. As will be seen, such functionality may be used to advise on power plant generating configurations for most efficiently satisfying plant performance goals, such those related to plant output level or capacity and efficiency. In such cases, model 82 may be comprised of several linked models that together model the operation of each of the generating units 26 and, thus, power plant 70 as a whole. As will be appreciated, the optimization cycle for the plant level application of optimization system 80 may be less frequent than that of the unit level. For example, at the plant level, the optimization cycle may be limited to one or more daily occurrences in relation to developing a generating plan and preparing a bid for a next day generating period. As will be seen, this type of functionality may be part of a configuration advisor feature, which is discussed below. Additionally, at the plant level, optimization system 80 may be used to provided suggested or proposed generating configurations for mitigating unanticipated performance issues, such as output shortfalls occurring within an ongoing generating period. As will be seen, this type of functionality may be part of a capacity advisor feature, which is also discussed below.

Model 82 of power plant 70 and generating units 26 may be developed based upon: 1) known first principle equations describing the system of generating unit 26; 2) data, resulting in an empirical model; or 3) a combination of known first principle equations and data. In developing models for certain generating units, first principles equations often are not easily derived. For this reason, it is sometimes preferred to build empirical model based upon data collected from the operation of generating unit 26. Optimizer 81 may include a nonlinear programming optimizer as well as other types of known optimizers, and may be used to solve optimization problems in accordance with embodiment of the present disclosure. For example, optimizer 81 may be used to minimize a "cost function", with is a mathematical representation of performance goals and constraints. For instance, to minimize NOx, the cost function includes a term that decreases as the level of NOx decreases. One common method for minimizing a cost function is known as gradient descent optimization. Gradient descent is an optimization algorithm that approaches a local minimum of a function by taking steps proportional to the negative of the gradient (or the approximate gradient) of the function at the current point. However, it is contemplated that the present disclosure may be implemented by using, individually or in combination, a variety of different types of optimization approaches within optimizer 81. These optimization approaches include, but not limited to, linear programming, quadratic programming, mixed integer non-linear programming, stochastic programming, global non-linear programming, genetic algorithms, and particle/swarm techniques.

Keeping in mind and drawing upon the ideas discussed above, attention will now turn to FIGS. 5 through 15 for the disclosure of the present disclosure via description of one or more example embodiments. As will be discussed further with reference to the flowchart of FIG. 12, a method is disclosed that relates to creating generating plans and submitting offer curves or bids for the dispatch of power plants, generating units, and/or a fleet of power plants. Such power plants and generating units, for example, may include any of those described above as well as others. As will be seen, this method may involve the use of several graphical user interfaces or screen displays that facilitate communication between a first user device, which may be used by a plant operator or manager (or "manager"), and a second user device, which may be used by an energy trader (or "trader"). The manager, as used herein, represents personnel associated with a power plant who are knowledgeable about current performance characteristics and involved in preparing generating plans for upcoming generating periods. The trader, as used herein, represents personnel responsible for preparing and submitting bids or otherwise involved in selling or trading the electricity generated by power plants within a market. Thus, when describing the flow chart of FIG. 12, reference may be made to the exemplary screen displays that are provided in FIGS. 5 through 11.

Figure 5:
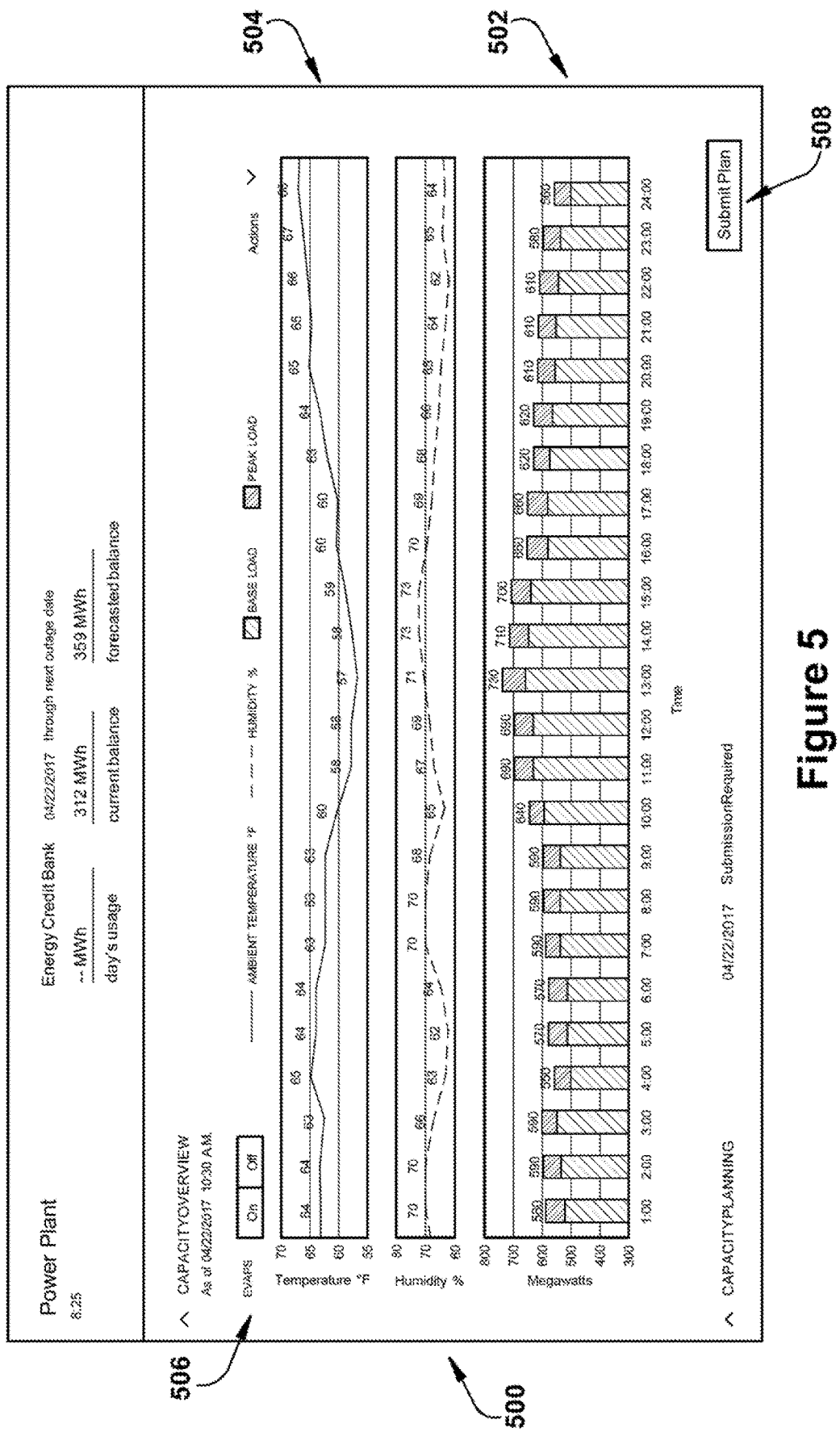
FIG. 5 provides an example graphical representation displaying power plant data in accordance with embodiments of the present disclosure.

For example, the initial graphical user interface shown in FIG. 5 provides the manager with a particular screen display—a capacity overview display 500—that includes information related to the predicted output capacity for the manager's power plant over a future generating period, which, for the purposes of illustration, may be also be referred to as a next day generating period. As will be appreciated, capacity overview display 500 presents to the manager a generating output schedule predicated on a proposed generating configuration or plan, which, according to exemplary embodiments, is supplied by a configuration advisor, which includes a model of the power plant that is used to optimize operations and, therefrom, advise on generating configurations that most efficiently satisfy defined goals given constraints, predicted conditions, and other criteria. As indicated, capacity overview display 500 may include a bar graph 502 showing the projected output by the hour for the next day generating period. Capacity overview 500 also may include an ambient plot 504 that corresponds to bar graph 502. The ambient plot 504 may include a graph of predicted ambient conditions, including temperature and humidity, over the next day generating period. As will be appreciated, the projected generating output of bar graph 502 is based on the predicted hourly ambient conditions. An evaporation emission control system (EVAPS) on/off selector 506 allows the manager to include/exclude the effect of using inlet chilling on next day projected capacity. Further, as shown, capacity overview display 500 includes a submit plan selector 608 that allows the manager to submit the generating plant to the trader once it is finalized.

Figure 6:
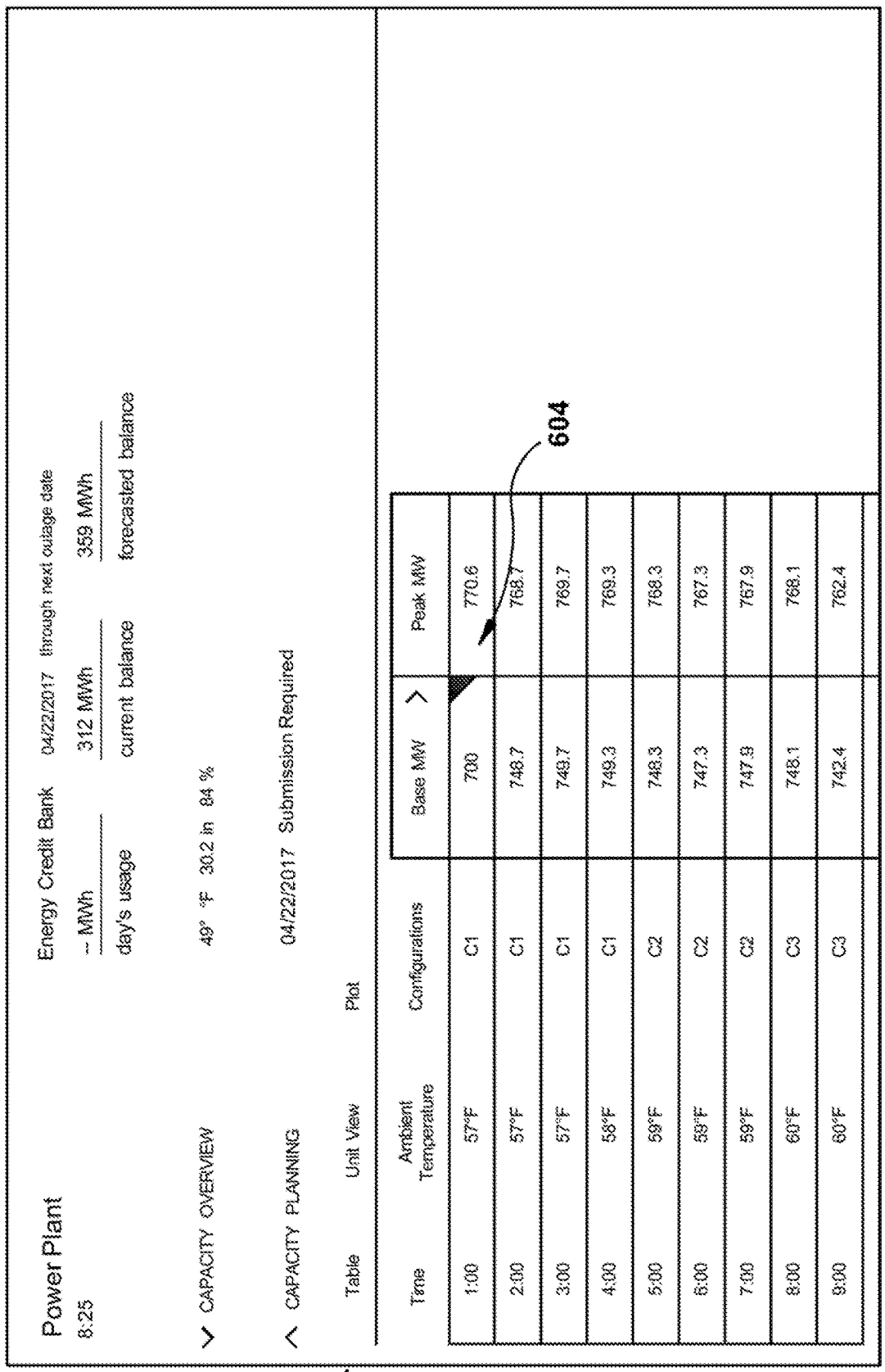
FIG. 6 provides an example graphical representation displaying power plant data in accordance with embodiments of the present disclosure.

With reference to FIG. 6, according to exemplary embodiments, the manager also may be provided with a capacity planning display 600, which includes further information relevant to preparing the generating plan for the power plant for the next day generating period. In this case, as shown, the information is displayed in a table view, which includes columns relating to categories such as time, ambient temperature, configuration, and base MW and peak MW. The time column within the table view, as indicated, may progress by the hour through the next day period, with the ambient temperature column reflecting the predicted ambient temperature for each of those hours. The configuration column of the table view provides an abbreviated notation (i.e., "C1", "C2", etc.) that communicates the suggested generating configuration for each of the hours of the next day period. The base and peak MW columns represent anticipated base and peak output levels, respectively, expressed in megawatts, for each of the hourly configurations, which is based on the configuration, expected ambient conditions, and performance characteristics of the power plant. As will be seen, the present disclosure may include functionality allowing the manager to tag explanatory notes to particular aspects of the proposed generating plan. Such explanatory notes then may be carried forward with the finalized or submitted generating plan, which is the generating plan once it has been submitted to the trader. For example, as provided in FIG. 6, an identifier tag 604 is shown as it might appear such that it signifies that a particular one of the table entries has a note appended to it.

Referring now to FIG. 7, an exemplary display 700 illustrates how an explanatory note 702 is created and entered by the manager. Specifically, upon selection of one of the table entries by the manager, a text box is generated, as shown on display 700, which the manager may then use to enter explanatory note 702. The manager may save explanatory note 702 so that it remains appended the table entry going forward and is accessible by the trader and other users. In the exemplary case shown, for example, the manager has entered text about a "repair valve" that, once saved, becomes explanatory note 702. Once the generating plan has been submitted by the manager, explanatory notes 702 may be accessed by the trader or other personnel to explain, for example, why changes, such as a modification to the generating configuration or output level, were made by the manager.

Figure 8:
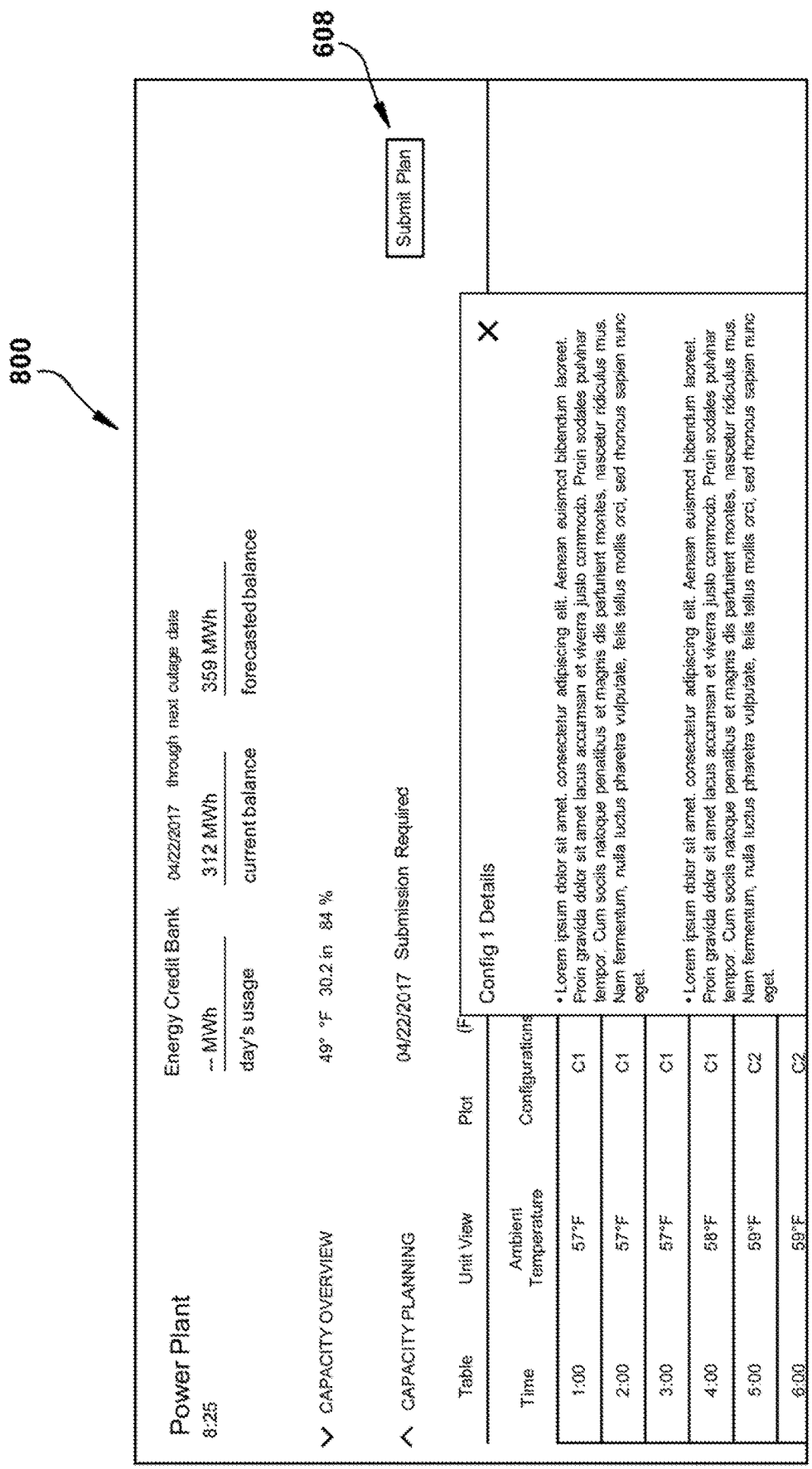
FIG. 8 provides an example graphical representation displaying power plant data in accordance with embodiments of the present disclosure.

As shown in FIG. 8, an exemplary display 800 is provided in which functionality within the capacity planning display 600 allows the manager to select particular table entries and access further information related to those entries. For example, as shown, upon selecting one of the configuration notations (in this case, "C1") in the configuration column provided in the table, a text box 802 is generated that gives more information regarding details of the "C1" configuration. In this way, the manager can be provided additional information concerning the proposed configuration for a particular hour in the generating plan. Information provided may include details of the configuration, such as, in the exemplary case of a combined cycle configuration in which a plurality of gas turbines is combined with a steam turbine, the number of gas turbines out of that plurality that will operate in combination with the steam turbine given the configuration notation.

As a further part of the functionality of the present disclosure, the manager is given the ability to make changes to the proposed generating plan. For example, the manager may adjust the output level or change the generating configuration that is presented to him in the proposed generating plan. Such changes may be applied over a short or extended time period, such as just one or several of the hours within the future generating period. Further, such changes, for example, may be based on factors affecting next day generation that the manager is aware of, but that were not available or not taken into account by the configuration advisor when the proposed generating plan was produced and issued to the manager for his consideration. For example, such factors may include an unscheduled maintenance procedure or a late arising technical issue affecting plant or unit availability or performance. The changes to the output level may be made within the table view by functionality allowing the manager to select one of the values within the table and then to input a revised value.

Figure 9:
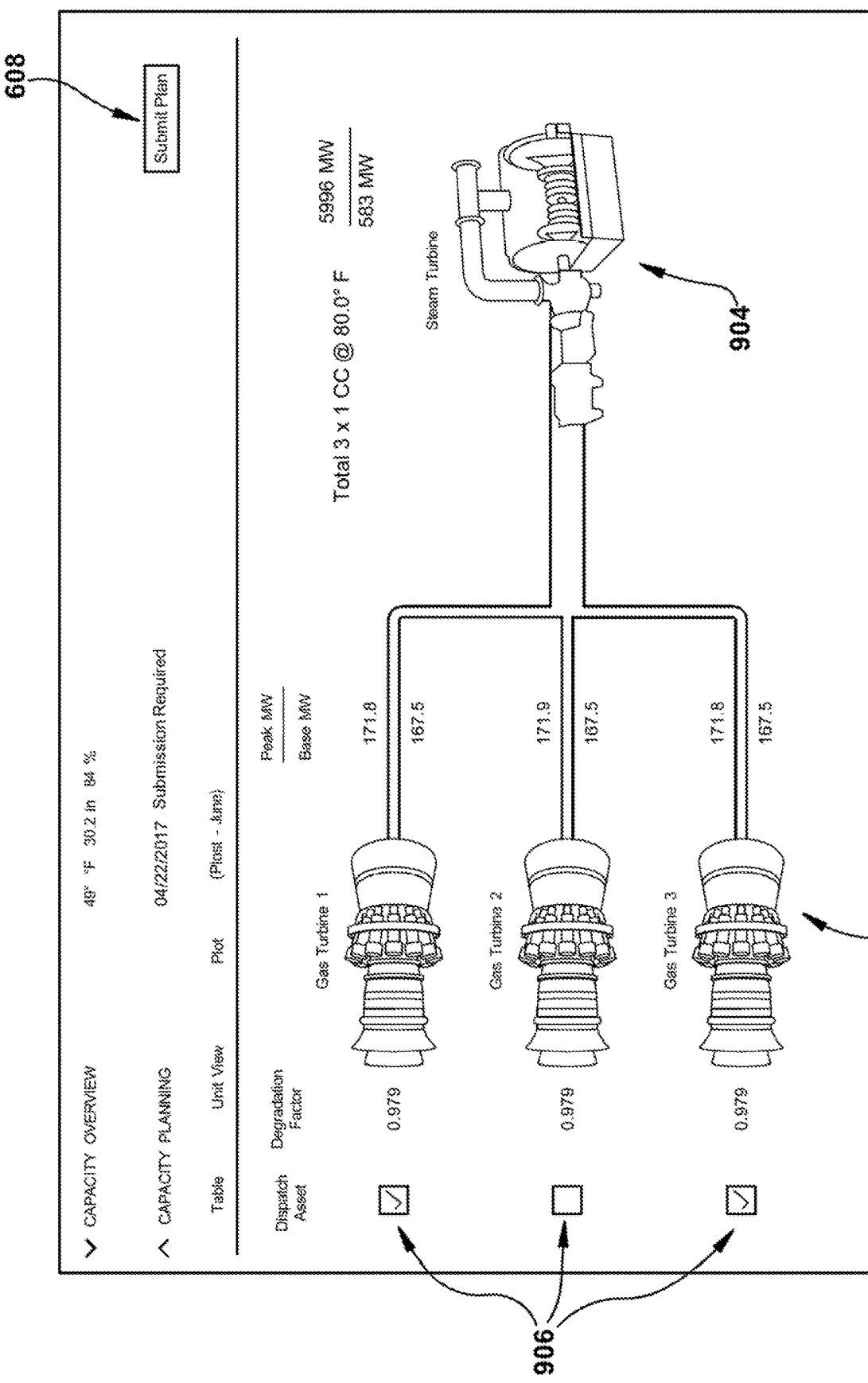
FIG. 9 provides an example graphical representation displaying power plant data in accordance with embodiments of the present disclosure.

As shown in FIG. 9, in regard to changes to the generating configuration of the plant, the manager may make such changes within a unit view display 900. As will be appreciated, unit view display 900 is configured to facilitate configuration modifications. Unit view display 900, for example, may include icons representing the applicable generating units. These icons, as shown, may include gas turbine icons 902, which represent the available gas turbines, and a steam turbine icon 904, which represents the steam turbine that is operably connected to the available gas turbines. Unit view display 900 may further include selection boxes 906 that correspond respectively to each of the gas turbine icons 902. Selection boxes 906, for example, are provided to allow for the selection of one or more of the gas turbines for operation during the next day generating period. As shown, for example, the "3×1" (i.e., where three operating gas turbines connect to a single operating steam turbine) configuration may be modified to a "2×1" configuration by deselecting one of the selection boxes 906 associated with a particular one of the available gas turbines. In the exemplary case show, this is done by removing the "check" that would have appeared in the middle selection box 906, which, for example, may be done by clicking on that particular selection box. As described above in relation to FIG. 7, the manager may append an explanatory note 702 that explains the reason why the configuration modification was made. The presence of one of the explanatory notes 702 may be shown in the table view by an accompanying identifier tag 604, discussed above. This note attaches to the adjusted configuration so that it may be referenced by the trader. Once the manager has made all the adjustments necessary, he/she may submit the generating plan to the trader by selecting submit plan selector 608, which may be included on the several of the displays already discussed.

A next step in the present method includes the trader preparing an offer curve or bid for submittal to a dispatch authority. According to the present disclosure, to prepare the bid, the trader may be presented with the generating plans as submitted by each manager for his power plants. For example, with reference to FIG. 10, each of the generating plans submitted by the managers may be compiled and presented to the trader as part of a trader display 1000. Specifically, trader display 1000 may include information related to generating configuration and output levels for each of the power plants and generating units within the fleet of power plants that the trader is responsible for. In this way, information related to the next day generating plans—as submitted by each of managers of the plants within the trader's fleet—is provided to the trader so that the trader may prepare the next day bid using an accurate and complete set of data relevant to this task. Trader display 1000 may include output for each of the power plants as well as an aggregated capacity for the fleet. Similar to that described above, functionality of the present disclosure may allow the trader to adjust capacity levels for the plants or for the fleet as necessary before submitting the final bid to dispatch authority.

As part of this process, any of the output levels or generating configurations that had been previously revised by the managers in the submitted generating plans may be highlighted or made apparent by some sort of indicator, such as by an indicator tag, icon, or modified font, so that revisions made by the manager are easily identified by the trader during bid preparation. The trader then has the option of clicking on any of the revisions to view any explanatory note that the manager included to explain why the revisions were made. For example, a text box may explain that a temporary outage necessitated revising plant output. An upload bid selector 1002 may be included on trader display 1000 that allows the trader to upload the bid to the dispatch authority once it has been finalized. Once uploaded, the dispatch authority uses the bids submitted by various traders to dispatch the anticipated customer load over the future generating period in accordance with a dispatch process. The dispatch authority then communicates the capacity awarded to each of the traders. The trader may then pass along plant-level results given the awarded capacity. As will be appreciated, often there are adjustments at the plant-level given the capacity awarded to the fleet. That is, the plant-level results of the awarded fleet-level capacity may include an output level for a particular power plant to remain the same or be different from the generating plan that was previously submitted to the trader by the manager. If equal, then no change to the generating plan is required. If not equal, the configuration advisor feature may be used to recommend a plant configuration and unit output level for most efficiently satisfying the revised output level for the power plant.

Figure 11:
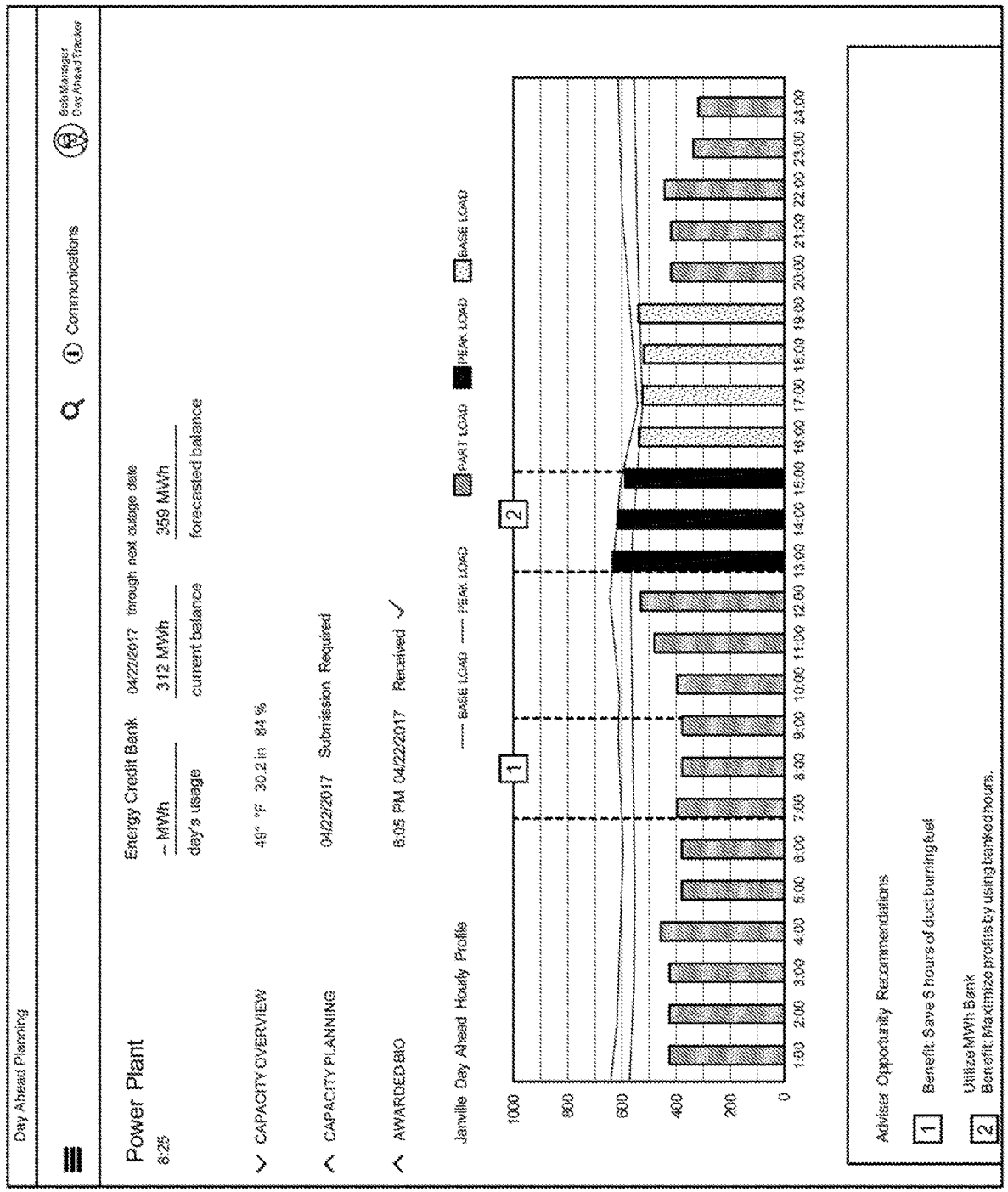
FIG. 11 provides an example graphical representation displaying power plant data in accordance with embodiments of the present disclosure.

FIG. 11 demonstrates an awarded bid display 1100 by which the results of the trader's bid is presented at the plant-level, i.e., to each of the managers of the power plants represented by the trader. As shown, the output level of the power plant, which may be the same or different than as previously submitted by the manager, may be shown via an hourly bar graph that communicates output level for each hour of the next day generating period. As shown in FIG. 11 (specifically in columns 1, 2, and 3), awarded bid display 1100 may include recommendations related to ramp up or startup and ramp down for satisfying the awarded bid. According to preferred embodiments, base load and peak load levels also may be shown for each of the hours. The manager may modify aspects of this generating plan based on the awarded capacity per the functionality already described. Once the manager has made any necessary adjustments, the generating plan represents the final version that will be used during the future generating period.

To summarize, in accordance with a preferred embodiment, as provided in FIGS. 5 through 11, the present disclosure may include presenting on a first or second user device, which are accessible by the manager or trader, respectively, several versions and related aspects of a generating plan for a future generating period. Further, the present disclosure may include receiving user inputs at either user device that modifies certain aspects of those generating plans so that those modification are tracked and accessible to both parties. As will be appreciated, these steps may include generating one or more graphical representations, which may include any of the visual text elements discussed above, and displaying those graphical representations one a display screen on the user device of the manager and/or trader. Further, The visual text elements may include selectable elements that, upon selecting, calls forth: additional visual text elements that provide information relating to the visual text element that was selected; and/or input windows through which the user may input modifications, such as modifications to generating configuration or output level is received, or enter explanatory notes. Such modifications or revisions may be indicated in saved versions of the generating plan by one or more types of indicators, for example, a tag identifier, icon, or changed appearance of the visual text element, as described above.

Figure 12:
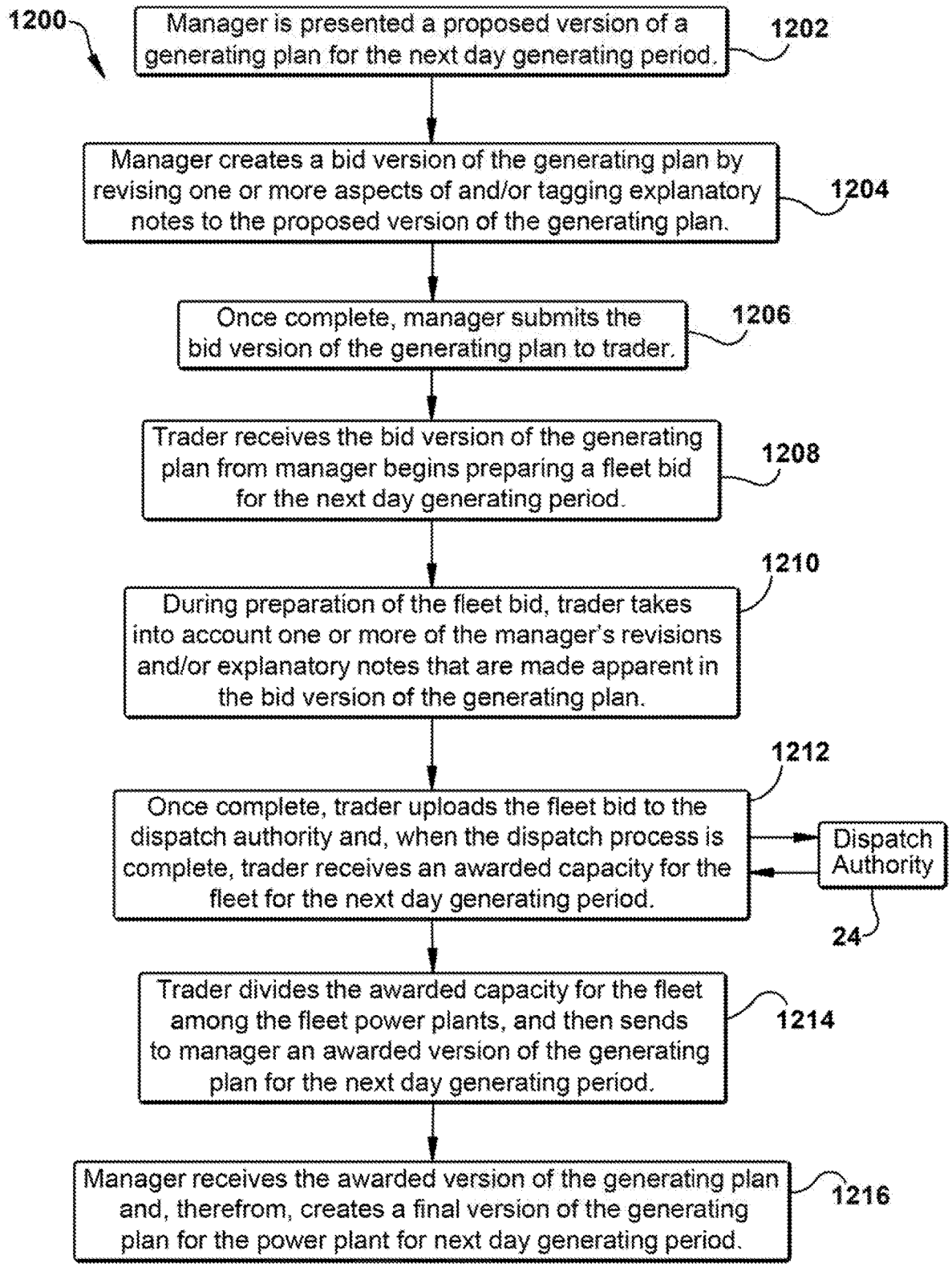
FIG. 12 is a flowchart illustrating an example method for processing and graphically displaying power plant data in accordance with an embodiment of the present disclosure.

With specific reference now to FIG. 12, a flow chart 1200 illustrates an exemplary method for creating and submitting competitive offer curves or bids related to the dispatch of power plants or generating units within a fleet of such power plants or generating units and for controlling power plant operations for improved performance. The power plant may include thermal generating units that are engageable according to a plurality of generating configurations for generating a plurality of output levels during a generating period. Further, it should be understood that over the generating period, a generating plan schedules the selection of the particular generating configuration and output level. To describe this process, several versions of such generating plans will be discussed. As will be seen, these versions include an initial or proposed version, which is presented to and revised as necessary by a plant manager to create a bid version. The bid version of the generating plan is the version submitted by the manager to the trader for purposes of preparing a bid. An awarded version of the generating plan represents the version sent by the trader back to the manager that may include plant-level modifications necessitated given the results of the bid, i.e., the capacity that the fleet was awarded. A final version of the generating plan is the version finally approved by the manager once he has reviewed and made any modifications to the awarded version.

Turning now to the method of flow chart 1200, at an initial step 1202, the plant manager is presented a proposed version of a generating plan for the future generating period, which, for example, may be a next day generating period. The proposed generating plan, for example, may be formulated the configuration advisor, as described above.

At a step 1204, the manager creates a bid version of the generating plan. The bid version of the generating plan is the plan that the manager submits to the trader for the sake of preparing the bid used to dispatch the power plant. In preparing the bid version of the generating plan, the manager may revise one or more aspects of and/or tag one or more explanatory notes to the proposed version of the generating plan. That is, the manager revises the proposed version of the generating plant as necessary to create the bid version. Such revisions may include modifying a generating configuration and/or an output level for the power plant during a defined period within the future generating period. Such adjustments may be based on factors that the manager is aware of, but that were not taken into account by the configuration advisor feature when the proposed generating plan was produced. The explanatory notes may be tagged to the revisions made by the manager to explain their necessity, such as why revisions were made to the hourly configuration or output level of the proposed generating plan. Once tagged, the explanatory notes are carried forward once with the bid version of the generating plant once it is submitted to the trader. As part of this step, the manager may be provided with any of the several types of screen displays described above, which may present the most current data and information in a particular manner for assisting with the development of the bid version of the generating plan. At a step 1206, the manager submits the bid version of the generating plan to the trader.

At a step 1208, the trader receives the bid version of the generating plan from manager and begins preparing a fleet bid for the future generating period. The trader also receives the bid versions of the generating plan from plant managers of the other power plants that the trader represents. From this information, the trader will prepare the bid that will ultimately be uploaded to the dispatch authority. Pursuant to the display screens already discussed, the capacity information and generating plans may be presented to the trader in total as well as by the individual power plant.

At a step 1210, during the preparation of the fleet bid, trader takes into account one or more of the manager's revisions and/or explanatory notes that are made apparent in the bid version of the generating plan. That is, the trader may access one or more of the explanatory notes of the bid version of the generating plan as appended by the managers. Further, the trader may take into account one or more indicators that make apparent those instances where the manager made revisions to the proposed version of the generating plan. In preparing the fleet bid, the trader may adjust the bid versions of the generating plan from one or more of the power plants in arriving at a total output for the fleet. The trader also may append explanatory notes to such adjustments, which may be communicated to the managers of the corresponding power plants later in the process.

At a step 1212, once the fleet bid is finalized, the trader uploads the bid to the dispatch authority. Once all bids have been submitted, the dispatch authority dispatches the anticipated customer load among the traders pursuant to a dispatch process. When the dispatch process is complete, the trader receives an awarded capacity for the fleet, which represents the load that the trader's fleet of power plants is obligated to generate during the future market period given the outcome of the dispatch process.

At a step 1214, the trader divides the awarded capacity for the fleet among the power plants in the fleet. That is, once the awarded capacity for the fleet is received, the trader parses that capacity among the power plants within the fleet and, in this way, determines plant-level bid results for each of the power plants within the fleet. Often, because the awarded capacity for the fleet is different than the capacity within the bid submitted by the trader, there are adjustments that need to be made to the bid versions of the generating plans for the some of the power plants. Once these adjustments are made so that cumulative plant-level capacity is equal to the total capacity awarded to the fleet, the trader may communicate an awarded version of the generating plan to each of the power plants within the fleet.

At a step 1216, the manager receives the awarded version of the generating plan and, therefrom, creates a final version of the generating plan for the power plant for future generating period. The awarded version of the generating plant represents the plant-level result of the dispatch process and may be different than what the manager previously sent in his bid version of the generating plan because, as stated, the capacity awarded the fleet may be different than what the trader bid for the fleet. If there is no change in the plant-level result for a particular power plant, then the previous bid version of the generating plan may be approved by the manager as the final version of the generating plan for the future generating period. However, if the output level of the power plant has changed in the plant-level result, the awarded version of the generating plan represents a suggested plan produced by the configuration advisor with possible input from the trader. Thus, the manager may make revisions as necessary to arrive at a final version of the generating plan that most efficiently satisfies the committed plant-level result. As stated, according to preferred embodiments, awarded bid display 1100 of FIG. 11 may be used to communicate the plant-level results to each of the particular power plants and facilitate the manager creating and approving the final version of the generating plan.

Figure 13:
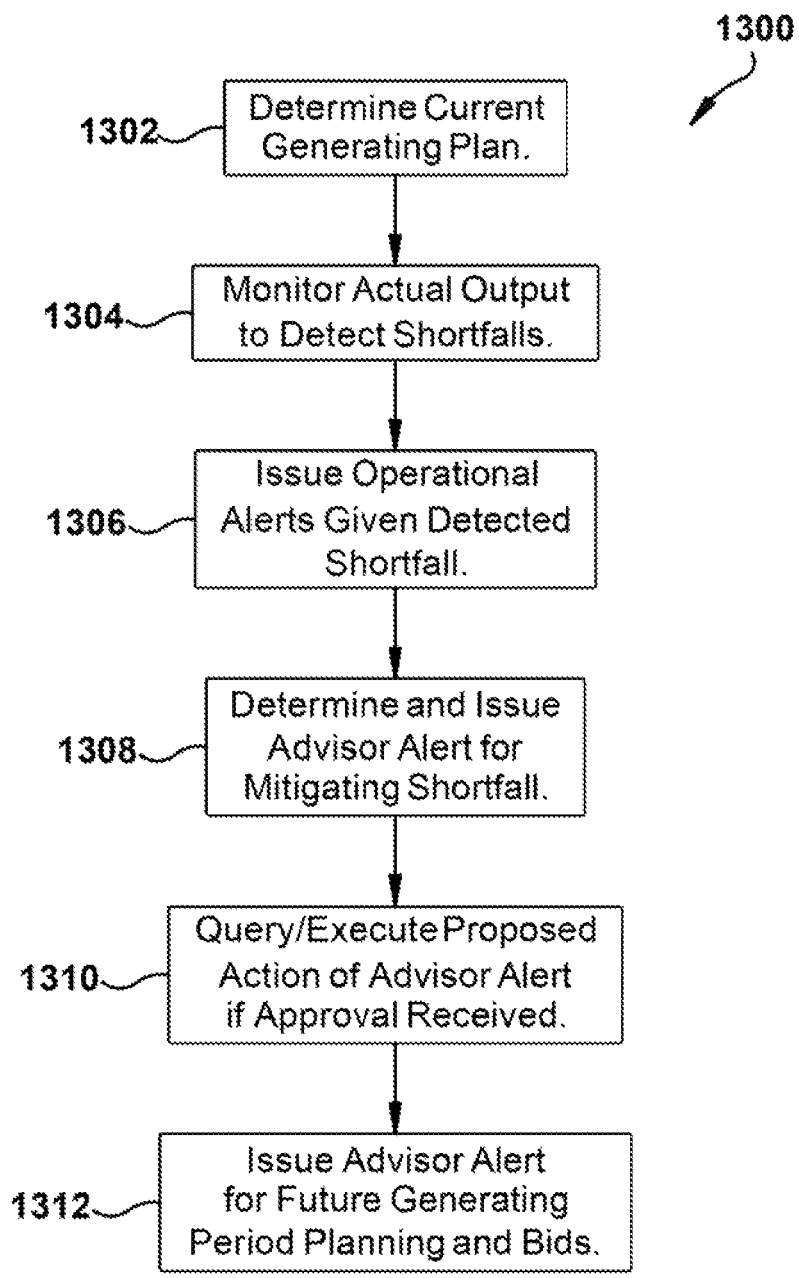
FIG. 13 is a flowchart illustrating an example method for processing and graphically displaying power plant data in accordance with an embodiment of the present disclosure.
Figure 14:
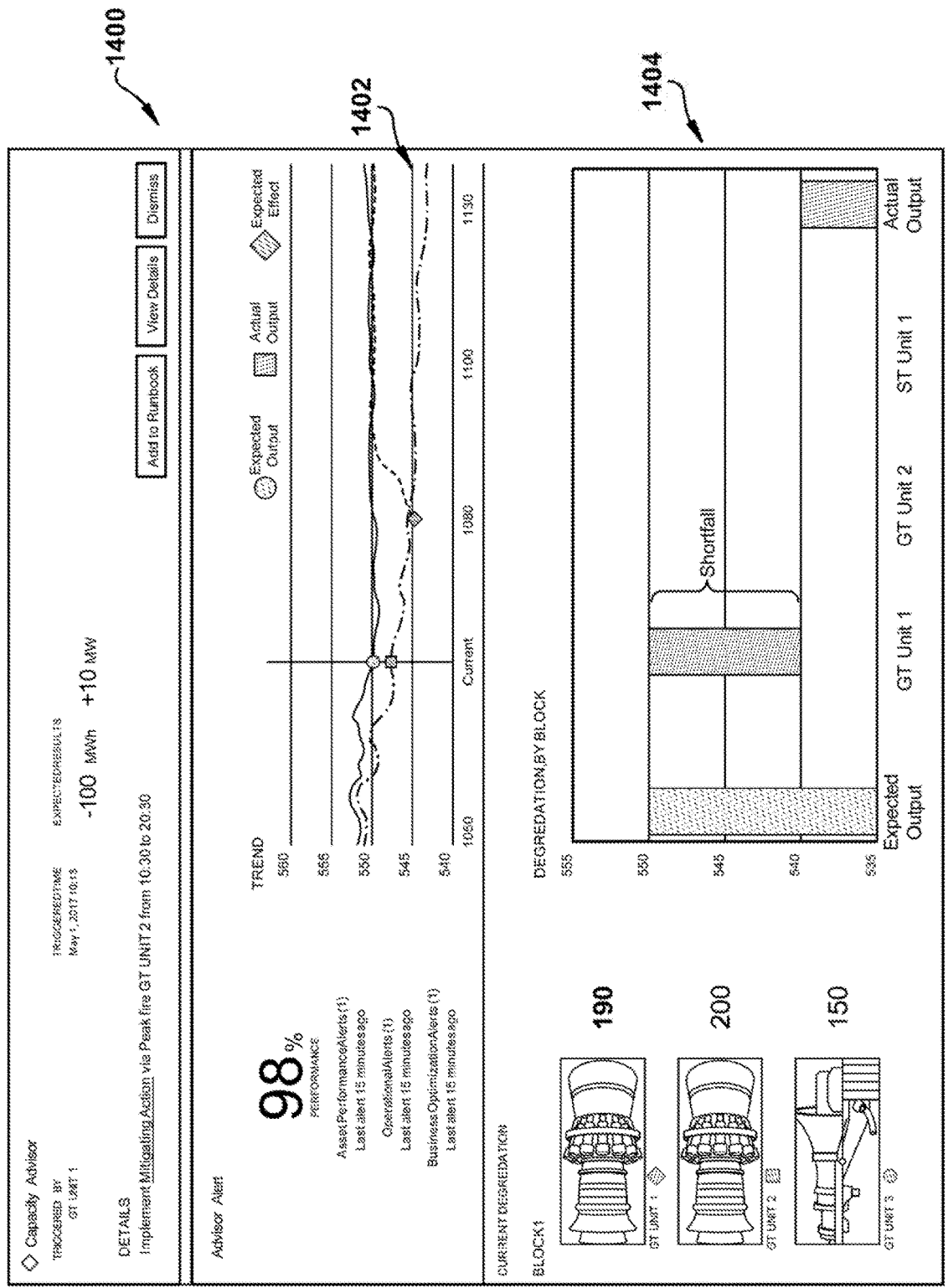
FIG. 14 provides an example graphical representation displaying power plant data in accordance with embodiments of the present disclosure.

Turning now to another aspect of the present disclosure, a capacity advisor will be presented with reference to FIGS. 13 and 14. As will be seen, the capacity advisor may be used to track the current performance of the power plant, recognize performance issues affecting the power plant's ability to satisfy output levels, efficiently communicate such issues to plant personnel, advise how those performance issues may be most efficiently mitigated so that the power plant achieves expected operational objectives, and/or uses the intelligence accumulated along the way toward the preparation of better generating plans and bids related to future generating periods. The capacity advisor also may implement such solutions by executing control actions that directly control the operation of the power plant and/or its generating units.

An example case will now be discussed in which a malfunctioning valve is discovered that impacts the performance of an inlet chiller component of a gas turbine generating unit within a power plant. As will be appreciated, inlet chillers may be optionally provided with gas turbines as a way to boost output. To do this, the inlet chiller injects water or some other evaporant into the flow of air entering the compressor of the gas turbine, thereby cooling the air, increasing mass flow through the engine, and boosting output capacity. In the exemplary case, a malfunctioning valve of the inlet chiller fails to fully open, which results in reducing the amount of water the inlet chiller is able to inject into the air flow and, because of this, the capacity of the inlet chiller to cool the incoming air and increase mass flow. This, of course, negatively impacts the total amount by which the chiller can boost the output for the gas turbine unit.

According to methods and systems of the present disclosure, the detection of performance shortfalls and/or the malfunctioning valve may trigger several actions or alerts, which will be referred to as operational alerts. Operational alerts, for example, may provide information describing the issue and the impact it is having on the operation of the generating unit and power plant. As will be seen, these operational alerts may be used to trigger other alerts, including other operational alerts and, as described below, advisor alerts. Operational alerts also may cause the implementation of control actions, the sending of communications to particular plant personnel regarding such actions, and/or the generation of certain screen displays. For example, an operational alert may be created that identifies and describes the particular operational issue that has been detected, for example, identifying the particular valve that is malfunctioning. An operational alert may provide information related to how the issue was detected, for example, stating that an actual inlet pressure for the particular valve is found as being above an expected inlet pressure, which signifies that the valve likely is not fully opening. Further, an operational alert may be created that describes one or more effects to the operation of the power plant or unit stemming from the malfunctioning valve, for example, stating that the actual inlet flow for the affected valve is below an expected inlet flow. Such operational alerts may quantify the amount by which the actual inlet flow is deficient. An operational alert may be created that communicates the effect that the malfunctioning valve is having on power plant and/or generating unit performance, including the shortfall in output level or capacity. For example, an operational alert may state that the actual output for the generating unit and/or the power plant is below an expected output. The expected output may be an amount that is expected from the power plant given a current bid or dispatch obligation. The expected output also may reflect the output predicted by a model (or "digital twin") of the generating unit or power plant, which was used to prepare the bid. The operational alert may quantify the extent of this shortfall, i.e., how much actual output is below expected output.

In response to these operational alert, the capacity advisor of the present disclosure may create advisor alerts aimed at mitigating the issue or problem. For example, an advisor alert may be created that identifies one or more mitigating actions that resolve or mitigate the performance shortfall in output level being caused by the malfunctioning valve. According to preferred embodiments, the advisor alert may identify opportunities by which the shortfall in output capacity is most efficiently avoided, such as, for example, by identifying another gas turbine unit for peak fire operation that is capable of making up for the loss of output caused by the malfunctioning valve. An advisor alert may be created that affects how the plant is operated in the future generating periods. Specifically, an advisor alert may be created that makes sure that the reduced capacity for the gas turbine with the malfunctioning valve is accounted for in the generating plans and bids that are prepared for future generating periods.

With reference to FIG. 13, a flow chart 1300 is provided as an example of a process in accordance with the present disclosure. Continuing with the example provided above regarding the malfunctioning valve, at an initial step 1302, the present method may begin by determining the generating plan for the power plant for the current generating period. For example, the method may include the capacity advisor of the present disclosure querying and receiving data stored in the system related to the current generating plan, which may have been created and stored therein by the manager in preparation for the current generating period and bidding process. As an example, the current generating plan may include a schedule where the power plant generates 550 MW, with 200 MW of that being generated by one of the gas turbines, a GT Unit 1 (or "GT Unit 1"). As will be appreciated, the current generating plan may reflect the plant-level bid or dispatch results, as described above.

At a next step, a step 1304, the present method may include monitoring the operation and performance of the power plant and its generating units. As part of this, the actual output of the power plant and its generating units are monitored during the current generating period and, from such monitoring, any performance anomalies or shortfalls may be identified. Continuing the example introduced above, given the monitored actual output of GT Unit 1 with activated inlet chilling early in the current generating period, the present method may determine that there is a differential between the actual output and the expected output, with the actual output being lower than expected output. The present method may require that the difference be greater than a predefined threshold before the issue is identified. Specifically, for example, the capacity advisor may determine that the actual output of GT Unit 1 is only 190 MW, which is 10 MW less than the expected output of 200 MW. As the 200 MW level is the amount that was included in the bid for the current generating period and awarded to the power plant at the close of the bidding process, the power plant may be assessed penalties if this shortfall is not corrected.

At a step 1306, the present method may include creating and issuing one or more operational alerts related to the identified shortfall. For example, an operational alert may be created and issued that describes the plant shortfall as well as which of the generating units is underperforming and causing the shortfall. For example, the operational alert may state that GT Unit 1 has a 10 MW shortfall or, more specifically, that the actual output of GT Unit 1 is 190 MW when the expected or bid output is 200 MW.

The present method may include the issuance of other operational alerts, which may be used to determine the root cause within the generating unit for the output shortfall. Such operational alerts for root cause analysis may describe any operational anomalies related to parameters associated with subsystems within GT Unit 1. For example, as provided above, an operational alert may be issued relating to the inlet pressure being higher than expected for a valve within the inlet chiller and/or the inlet flow for that valve being lower than expected. As will be appreciated, such operational alerts may be used to determining the root cause of the output shortfall. Once the root cause is determined—i.e., that the reduced output is due to a valve in the inlet chiller that is not fully opening—the current method may determine whether an immediate fix is possible and/or desirable, which may be include a series of queries/responses with the plant manager and other plant personnel. In this case, it will be assumed that an immediate fix of the valve is not possible.

At a step 1308, the capacity advisor of the present disclosure may calculate one or more mitigating actions by which the plant can mitigate, address, or resolve the current shortfall, or a portion thereon, during the remainder of the current operating period. Once this is determined, the present method may issue an advisor alert that communicate the exact nature of those mitigating actions and the tradeoffs and consequences associated with each action. To determine the mitigating actions, the capacity advisor may perform a configuration optimization routine, such as that introduced above in relation to the configuration advisor, where a model of the power plant and its generating units is used to determine the most efficient generating configuration for making up the 10 MW shortfall over the remainder of the generating period in view of current operating conditions and other constraints (including the now limited capacity for GT Unit 1). In this way, the power plant's current generating configuration may be modified so that, over the remainder of the current generating period, the generating units can be operated in a way that satisfies or more closely satisfies the expected output level of the power plant. Once these mitigating actions are determined, an advisor alert may be created that identifies one or more the mitigating actions, which, as will be appreciate, compensate for the negative impact to performance caused by the malfunctioning valve in the inlet chiller. Thus, according to preferred embodiments, the advisor alert identifies opportunities by which the shortfall in output for the power plant is most efficiently mitigated or avoided altogether. For example, the advisor alert may identify another gas turbine unit, a gas turbine unit 2 ("GT Unit 2"), for a modified operating mode for the remainder of the current generating period. For example, the operation of GT Unit 2 may be modified to a peak fire mode that results in an increase to the power plant's output level in an amount equal to the shortfall of GT Unit 1.

At a step 1310, the present method may query the plant manager as to whether the mitigating action or modification recommended in the advisor alert is accepted. If it is accepted by the manager, the present method may execute control actions for implementing the accepted mitigating action of the advisor alert. According to other embodiments, the present method may automatically execute the proposed mitigating action of the advisor alert. Thus, for example, the method executes by peak firing GT Unit 2 to generate an additional 10 MW and returning GT Unit 1 to a base load operating mode without inlet chilling.

At a step 1312, the present method may include a further advisor alert being created for modifying how future generating periods are planned and bid. Specifically, an advisor alert is created that ensures that the reduced capacity for the GT Unit 1 is taken into account during the preparation of generating plans and bids for future generating periods. For example, such advisor alerts may include an indicator and explanatory note in one or more of the screen displays described above in relation to the bidding process. As should be appreciated, this type of advisor alert will be carried forward until the valve problem is resolved and GT Unit 1 returns to normal capacity. In this way, the power plant will not be over bid during the dispatch process. If the dispatch process has already begun and the bid is being prepared by the trader, the advisor alert may be configured to directly notify the trader of the change in capacity so that it may be included in the bid.

FIG. 14 provides a screen display 1400 that may be generated in accordance with the present disclosure and, for example, used to communicate aspects of one of the above-described advisor alerts. As part of this screen display, an output comparison plot 1402 is included that, for the current operating period, plots expected output, actual output, and the expected effect of the mitigating action versus time. As used herein, the expected effect of the mitigating action is the predicted change in actual output for the power plant if the generating configuration is modified pursuant to the suggestion of the advisor alert. Thus, as indicated in output comparison plot 1402, at the current time there is a gap or shortfall existing between expected and actual output level, which is predicted to widen and then remain substantially constant through the remainder of the current generating period. As also shown, the expected effect of the mitigating action shows that the predicted shortfall may be substantially avoided or mitigated by accepting the recommended mitigating action of the advisor alert. As will be appreciated, there is a delay occasioning in transitioning between the current generating configuration and the modified configuration of the advisor alert. As will be appreciated, this results in a lag between the time when the decision to accept the mitigating action is made and when the full effect of the modified operation mode is realized in the increased output level of the power plant. This lag time is represented in the output comparison plot 1402.

The screen display 1400 also may include a bar graph 1404 where degradation is apportioned by generating unit. Thus, as shown, bar graph 1402 may include a bar representing expected output, which is the bar on the left end, and a bar representing actual output, which is the bar on the right end. In between, locations for bars are provided for each of the generating units of the plant, including a GT Unit 1 location, a GT Unit 2 location, and a location for a steam turbine unit (or "ST Unit 1"). In the exemplary situation, because the current plant shortfall is determined to be a shortfall in output that pertains to GT Unit 1, the 10 MW shortfall is represented as a 10 MW bar in the GT Unit 1 location. As will be appreciated, bar graph 1404 efficiently communicates the generating unit responsible for the current shortfall in plant generating output.

Figure 15:
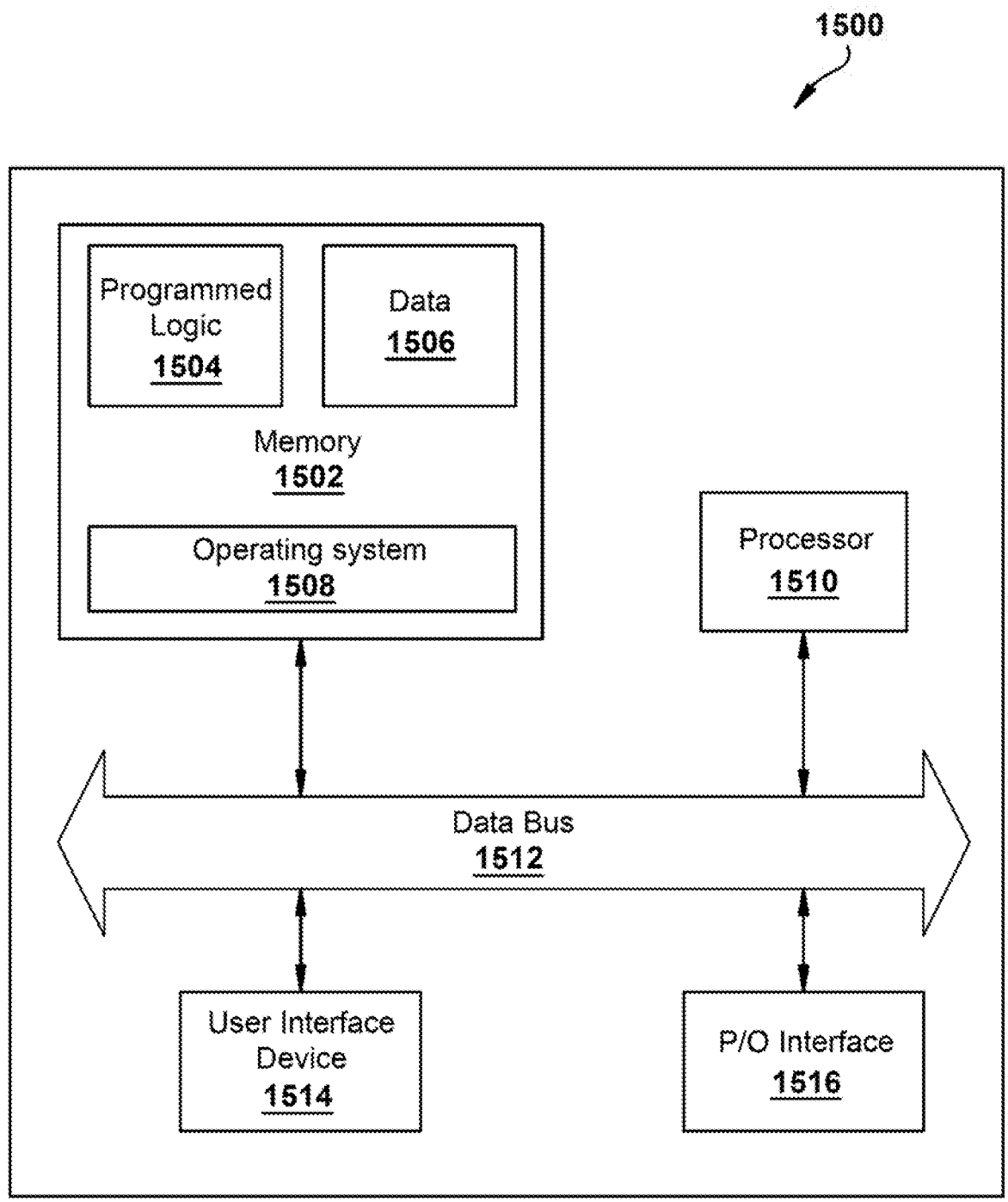
FIG. 15 depicts a schematic diagram illustrating an exemplary computer system for performing any one or more of the methods discussed herein.

FIG. 15 depicts a schematic diagram illustrating an example computer system 1500 for acting as any of the computer resources described above or performing any of the methods that will be discussed herein. Computer system 1500 may include a memory 1502 that stores programmed logic 1504 (e.g., software) and data 1506. Memory 1502 also may include an operating system 1508. A processor 1510 may utilize operating system 1508 to execute programmed logic 1504, and in doing so, may also utilize data 1506. A data bus 1512 may provide communication between memory 1502 and processor 1510. Users may interface with computer system 1500 via at least one user interface device 1514, such as a keyboard, mouse, touchscreen, gesture control device, wearable computer, control panel, or any other device capable of communicating data to and from computer system 1500. Computer system 1500 may be in communication with customer equipment and its associated devices online, including sensors or data recorded from such sensors, while operating, as well as in communication with the customer equipment and its associated devices offline while not operating, via an input/output (I/O) interface 1516. More specifically, computer system 1500 may carry out the execution of model-based instructions for, but not limited to, providing command signals to certain devices of the customer equipment and/or its associated devices, as provided herein. Computer system 1500 and programmed logic 1504 implemented thereby may include software, hardware, firmware, or any combination thereof. It should also be appreciated that multiple controllers or processors may be used in computer system 1500, whereby different features described herein may be executed on one or more different controllers or processors.

Accordingly, computer system 1500 may be used to implement embodiments of the present disclosure or components or aspects of those embodiments. According to example embodiments, the included figures may reference block diagrams of systems, methods, apparatuses, and computer program products. It should be understood that at least some of the blocks of such block diagrams, and combinations of blocks in the block diagrams may be implemented, at least partially, by computer program instructions, which may be loaded onto a general purpose computer, such as computer system 1500, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed. The computer program instructions mentioned herein may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks. One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and so forth.

As one of ordinary skill in the art will appreciate, the many varying features and configurations described above in relation to the several exemplary embodiments may be further selectively applied to form the other possible embodiments of the present disclosure. For the sake of brevity and taking into account the abilities of one of ordinary skill in the art, all of the possible iterations is not provided or discussed in detail, though all combinations and possible embodiments embraced by the several claims below are intended to be part of the present application. In addition, from the above description of several exemplary embodiments, those skilled in the art likely will perceive improvements, changes and modifications. The appended claims are intended to cover such improvements, changes and modifications. It should be understood that numerous changes and modifications may be made to the subject matter disclosed herein without departing from the spirit and scope of the invention as defined by the following claims and the equivalents thereof.

That which is claimed:

1. A system comprising:
a power plant that includes thermal generating units that are engageable according to a plurality of generating configurations for generating a plurality of output levels during a generating period, wherein, during the generating period, a generating plan schedules a selection of a generating configuration from the plurality of generating configurations and an output level from the plurality of output levels for the power plant;
a hardware processor;
a first user device used by a first user;
a second user device that used by a second user;
a machine-readable storage medium on which is stored instructions that cause the hardware processor to execute a process related to controlling the power plant during a future generating period, wherein the process includes the steps of:
presenting on the first user device a proposed version of the generating plan for the future generating period;
receiving at the first user device a user input making a first modification that modifies an aspect of the proposed version of the generating plan and, thereby, creates a bid version of the generating plan;
presenting on the second user device the bid version of the generating plan so that an indicator indicates the aspect that was modified by the first modification;
receiving a user input on the second user device for creating a bid for a power plant fleet for generating a fleet capacity during the future generating period, wherein the bid is based, at least in part, on the bid version of the generating plan, and wherein the power plant fleet comprises the power plant and one or more other power plants;
transmitting from the second user device the bid; and
receiving at the second user device a response to the bid, the response comprising an awarded fleet capacity for the future generating period, wherein the process further comprises the steps of:
transmitting from the second user device to the first user device an awarded plant-level capacity that is based on the awarded fleet capacity for the power plant fleet;
receiving at the first user device the awarded plant-level capacity and, based thereon, presenting on the first user device an awarded version of the generating plan;
receiving at the first user device a user input making a second modification that modifies the awarded version of the generating plan and, thereby, creates a final version of the generating plan; and when the future generating period begins, sending a control command that modifies a setting of at least one actuator associated with at least one of the thermal generating units of the power plant, wherein the control command comprises operating the at least one of the thermal generating units in accordance with the final version of the generating plan.

2. The system according to claim 1, wherein the first user comprises a manager of the power plant, and the second user comprises a trader representing the power plant fleet in a power market;
wherein the awarded fleet capacity comprises a combined output that the power plant fleet is obligated to generate during the future generating period pursuant to a result of the bidding process;
wherein the proposed version of the generating plan comprises a generating plan formulated by a configuration advisor that optimizes the generating configuration and the output level for the power plant given at least one performance goal and data related to predicted operating conditions during the future generating period; and
wherein the bid is transmitted to a predetermined destination for participating in a bidding process that determines the fleet capacity during the future generating period.

3. The system according to claim 1, wherein the future generating period is divided into subperiods; and
wherein the step of presenting on the first user device the proposed version of the generating plan for the future generating period comprises:
generating a first graphical representation comprising visual text elements that are configured to output on a display screen of the first user device; and
outputting the first graphical representation to the display screen of the first user device.

4. The system according to claim 3, wherein the visual text elements of the first graphical representation comprise:
a bar graph showing a projected output level for the power plant over the future generating period per the subperiods; and
a plot of predicted ambient conditions for the power plant over the future generating period per the subperiods, wherein the predicted ambient conditions includes at least a temperature and a humidity;
wherein the projected output level of the bar graph is based on the predicted ambient conditions of the plot.

5. The system according to claim 4, wherein the thermal generating units include at least one gas turbine having an inlet chiller;
wherein the visual text elements of the first graphical representation comprise:
an evaporation emission control system (EVAPS) on/off selector that, upon selecting, toggles the first graphical representation between including/excluding, respectively, an effect of using the inlet chiller on the projected output level of the bar graph.

6. The system according to claim 3, wherein the visual text elements of the first graphical representation comprise:
a configuration notation for each of the subperiods of the future generating period that communicates the generating configuration of the power plant; and
data that communicates a projected output level for the generating configuration for each of the subperiods of the future generating period.

7. The system according to claim 6, wherein the configuration notations of the first graphical representation each comprises a selectable element that, upon selecting, calls forth additional visual text elements that provide information regarding whichever of the plurality of generating configurations the selected configuration notation pertains.

8. The system according to claim 6, wherein the visual text elements of the first graphical representation comprise selectable elements that, upon selecting, call forth an input window through which the user input making the first modification is received, wherein the first modification comprises at least one of:
   a modification to the generating configuration for one or more of the subperiods of the future generating period; and
   a modification to the output level for one or more of the subperiods of the future generating period.

9. The system according to claim 8, wherein the input window comprises a selection box that corresponds to an icon that visually represents one of the generating units of the power plant; and
   wherein selecting/deselecting the selection box modifies the generating configuration of the power plant by activating/deactivating, respectively, the one of the generating units represented by the corresponding icon.

10. The system according to claim 8, wherein the process further comprises the step of:
   receiving at the first user device a user input making a third modification that modifies an aspect of the proposed version of the generating plan and, thereby, creates a bid version of the generating plan;
   wherein the visual text elements of the first graphical representation comprise selectable elements that, upon selecting, call forth an input window through which the user input making the third modification is received, wherein the third modification comprises an explanatory note that explains a reason for making the modification to the at least one of: the modification to the generating configuration for one or more of the subperiods of the future generating period; and
   the modification to the output level for one or more of the subperiods of the future generating period.

11. The system according to claim 1, wherein the future generating period is divided into subperiods; and
   wherein the step of presenting on the second user device the bid version of the generating plan for the future generating period comprises:
   generating a second graphical representation comprising visual text elements that are configured to output on a display screen of the first user device; and
   outputting the second graphical representation to the display screen of the second user device.

12. The system according to claim 11, wherein the visual text elements of the second graphical representation comprise:
   data communicating at least one of the output level and the generating configuration for the power plant per the subperiods of the future generating period; and
   data communicating an aggregated output level for the power plant fleet per the subperiods of the future generating period.

13. The system according to claim 11, wherein the indicator comprises an identifier tag in close proximity to the visual text element corresponding to the aspect that was modified by the first modification.

14. The system according to claim 11, wherein indicator comprises an appearance of the visual text element corresponding to the aspect that was modified by the first modification being modified in comparison to other of the visual text elements that display like data.

15. The system according to claim 3, wherein the step of presenting on the first user device the awarded version of the generating plan for the future generating period comprises:
   generating a third graphical representation configured to output on a display screen of the first user device;
   outputting the third graphical representation to the display screen of the first user device;
   wherein:
   the visual text elements of the third graphical representation are configured to communicate the output level for each of the subperiods of the future generating period;
   the future generating period comprises a next day generating period and the subperiods comprise hours; and
   the generating units comprises a plurality of gas turbines and at least one steam turbine.

16. A method for controlling a power plant that includes thermal generating units that are engageable according to a plurality of generating configurations for generating a plurality of output levels during a generating period, wherein, during the generating period, a generating plan schedules a selection of a generating configuration from the plurality of generating configurations and an output level from the plurality of output levels for the power plant, the method including the steps of:
   presenting on a first user device a proposed version of the generating plan for a future generating period;
   receiving at the first user device a user input making a first modification that modifies an aspect of the proposed version of the generating plan and, thereby, creates a bid version of the generating plan;
   presenting on a second user device the bid version of the generating plan so that an indicator indicates the aspect that was modified by the first modification;
   receiving a user input on the second user device for creating a bid for a power plant fleet for generating a fleet capacity during the future generating period, wherein the bid is based, at least in part, on the bid version of the generating plan, and wherein the power plant fleet comprises the power plant and one or more other power plants;
   transmitting from the second user device the bid; and
   receiving at the second user device a response to the bid, the response comprising an awarded fleet capacity for the future generating period, further comprising the steps of:
   transmitting from the second user device to the first user device an awarded plant-level capacity that is based on the awarded fleet capacity for the power plant fleet;
   receiving at the first user device the awarded plant-level capacity and, based thereon, presenting on the first user device an awarded version of the generating plan;
   receiving at the first user device a user input making a second modification that modifies the awarded version of the generating plan and, thereby, creates a final version of the generating plan; and
   when the future generating period begins, sending a control command that modifies a setting of at least one actuator associated with at least one of the thermal generating units of the power plant, wherein the control command comprises operating the at least one of the thermal generating units in accordance with the final version of the generating plan.

17. The method according to claim 16, wherein the first user comprises a manager of the power plant, and the second user comprises a trader representing the power plant fleet in a power market;

wherein the awarded fleet capacity comprises a combined output that the power plant fleet is obligated to generate during the future generating period pursuant to a result of the bidding process;

wherein the proposed version of the generating plan comprises a generating plan formulated by a configuration advisor that optimizes the generating configuration and the output level for the power plant given at least one performance goal and data related to predicted operating conditions during the future generating period; and wherein the bid is transmitted to a predetermined destination for participating in a bidding process that determines the fleet capacity during the future generating period.

18. The method according to claim 16, wherein the future generating period is divided into subperiods; and wherein the step of presenting on the first user device the proposed version of the generating plan for the future generating period comprises:

generating a first graphical representation comprising visual text elements that are configured to output on a display screen of the first user device; and outputting the first graphical representation to the display screen of the first user device.

\* \* \* \* \*